US009286621B2

(12) United States Patent
Dubey et al.

(10) Patent No.: US 9,286,621 B2
(45) Date of Patent: Mar. 15, 2016

(54) INDEPENDENT TARGETED SPONSORED CONTENT MANAGEMENT SYSTEM AND METHOD

(71) Applicant: LinkedIn Corporation, Mountain View, CA (US)

(72) Inventors: Sanjay Sureshchandra Dubey, Fremont, CA (US); Nihar N Mehta, Sunnyvale, CA (US); Sanjay Kshetramade, Fremont, CA (US); Ashvin Kannan, Sunnyvale, CA (US); Carleton Miyamoto, Mountain View, CA (US)

(73) Assignee: LinkedIn Corporation, Mountain View, CA (US)

( * ) Notice: Subject to any disclaimer, the term of this patent is extended or adjusted under 35 U.S.C. 154(b) by 5 days.

(21) Appl. No.: 14/141,314

(22) Filed: Dec. 26, 2013

(65) Prior Publication Data
US 2015/0039406 A1 Feb. 5, 2015

Related U.S. Application Data

(60) Provisional application No. 61/860,393, filed on Jul. 31, 2013, provisional application No. 61/860,371, filed on Jul. 31, 2013.

(51) Int. Cl.
*G06F 15/16* (2006.01)
*G06Q 30/02* (2012.01)

(52) U.S. Cl.
CPC ............ *G06Q 30/0242* (2013.01); *G06F 15/16* (2013.01)

(58) Field of Classification Search
CPC ... G06Q 30/02; G06Q 50/01; G06Q 30/0241; G06Q 30/0255
See application file for complete search history.

(56) References Cited

U.S. PATENT DOCUMENTS

| 6,665,649 | B1* | 12/2003 | Megiddo | 705/37 |
|---|---|---|---|---|
| 7,724,779 | B2* | 5/2010 | Morimura et al. | 370/509 |
| 2004/0107137 | A1* | 6/2004 | Skinner | 705/14 |
| 2006/0036493 | A1* | 2/2006 | Aufricht et al. | 705/14 |
| 2007/0214132 | A1* | 9/2007 | Grubb et al. | 707/5 |
| 2007/0271145 | A1* | 11/2007 | Vest | 705/14 |
| 2009/0094073 | A1* | 4/2009 | Cheung et al. | 705/7 |
| 2010/0228618 | A1* | 9/2010 | Mitchell et al. | 705/14.39 |
| 2010/0293059 | A1* | 11/2010 | Davison | 705/14.69 |
| 2011/0082741 | A1* | 4/2011 | Boal | 705/14.39 |
| 2012/0136722 | A1* | 5/2012 | Kothiwal et al. | 705/14.54 |
| 2013/0091014 | A1* | 4/2013 | Kellogg | 705/14.54 |
| 2013/0151326 | A1* | 6/2013 | Engstrom et al. | 705/14.27 |

* cited by examiner

*Primary Examiner* — Jamie Kucab
*Assistant Examiner* — Kyle Robinson
(74) *Attorney, Agent, or Firm* — Schwegman Lundberg & Woessner, P.A.

(57) ABSTRACT

A system may include a database configured with individual partitions, one of the partitions corresponding to a sponsored content campaign of a social network. The system may further include multiple servers each communicatively coupled to the database, and each configured to implement a campaign having a campaign termination criterion. Each of the servers may include a processor configured to track sponsored content event data received from a user device based on the campaign and transmit the event data to the database and terminate the campaign based on a comparison of the event data as received from a partition of the database corresponding to the campaign and an estimation of event data not received from the database. The database may be configured to store the event data as received from the servers in the partition corresponding to the campaign upon receipt of the event data.

20 Claims, 22 Drawing Sheets

INDEPENDENT TARGETED SPONSORED CONTENT MANAGEMENT SYSTEM AND METHOD

PRIORITY

This application claims priority to U.S. Provisional Application No. 61/860,393, "INDEPENDENT TARGETED SPONSORED CONTENT MANAGEMENT SYSTEM AND METHOD", filed Jul. 31, 2013, which is incorporated herein in its entirety.

This application claims priority to U.S. Provisional Application No. 61/860,371, "INDEPENDENT TARGETED SPONSORED CONTENT MANAGEMENT SYSTEM", filed Jul. 31, 2013, which is incorporated herein in its entirety.

TECHNICAL FIELD

The subject matter disclosed herein generally relates to a system for independently targeting sponsored content.

BACKGROUND

Contemporary social networks display content from a variety of sources. Member profiles, user messages and comments, information from groups and companies, advertisements, and the like can combine to create the overall content that constitutes at least some of the content that can be displayed on a web page to users of the social network. Some of the content can be generated organically by the users of the social network and the activities of the members of the social network. So-called organic content may not, in some examples, include content such as imported content or system-generated content. Some of the content, such as targeted messages, slideware, whitepapers, and advertisements, can be sponsored by the creators or providers can be displayed to users based, for instance, on the creator or provider paying a fee to the provider of the social network to have that content displayed on the social network.

BRIEF DESCRIPTION OF THE DRAWINGS

Some embodiments are illustrated by way of example and not limitation in the figures of the accompanying drawings.

DETAILED DESCRIPTION

Figure 1:
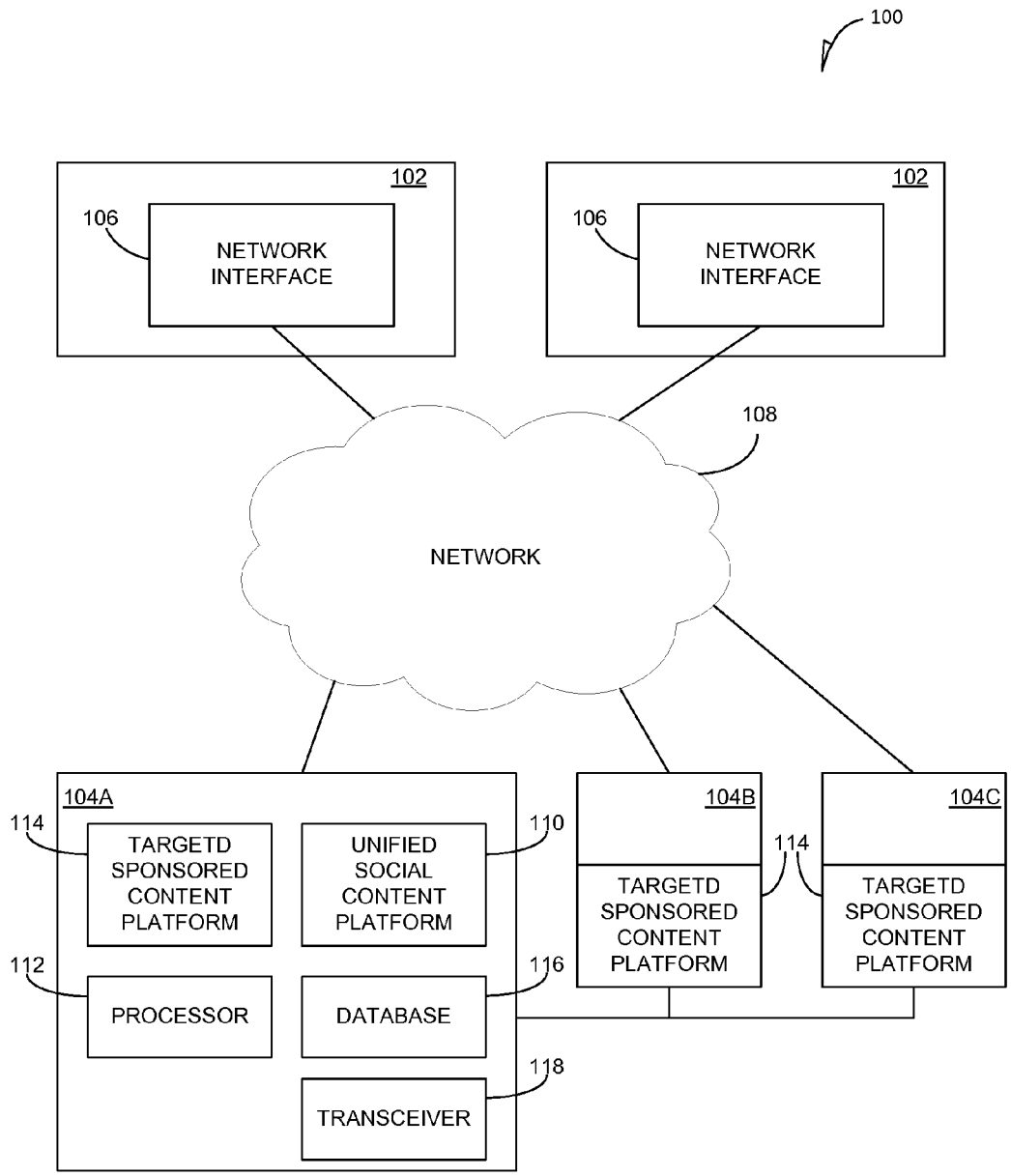
FIG. 1 is a block diagram of a system including user devices and a social network server.

Example methods and systems are directed to the generation of targeted sponsored content on a social network. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Sponsored content may advantageously targeted to individual users of the social network based a sponsored content campaign established and paid for by a sponsor of the content, such as a company, organization, or individual. The campaign may direct sponsored content based on a profile of the user incorporating various characteristics of the user, such as the user's social network profile, the user's behavior or activities, and the user's social graph, such as people, companies, and groups that the user has connected with, follows, or joins within the social network, the potential fragmentation of information within the social network can limit the ability to target individual users with sponsored content effectively. Moreover, if one subsystem presents organically generated content to a user at the same or close time another subsystem presents the same or essentially the same content to the user, the sponsored content may be unnecessarily duplicative. Unnecessary duplication may harm user satisfaction generally as well as the satisfaction of the entity sponsoring the content.

However, certain social networks may incorporate a number of users or resources that are impractical to operate on a single server. Many social networks incorporate multiple servers spread out over potentially large geographic areas in order to provide the social network. The dispersed nature of the social network infrastructure may support a large network but may make coordination of various services, such as a sponsored content campaign, more challenging than they may be if the services were centrally located.

A social network system has been created that can provide sponsored content campaigns among a variety of servers or data centers. Each server can be configured to implement the campaign according to campaign criteria, including a campaign termination criterion. Each server can provide the campaign for users of the social network according to the campaign criteria but without necessarily utilizing constant interaction between the servers or common social network resource. As a result, the social network infrastructure may be dispersed but provide sponsored content campaigns.

Within the context of a social network disclosed herein, content can be defined as relatively complex, domain-specific media that can utilize server resources to be created and maintained. An activity, in contrast, can describe an event, such as when content is created, shared, or otherwise interacted with on the social network. An activity can include a summary of content and a link to the content.

FIG. 1 is a block diagram of a social network system 100 including user devices 102 and multiple social network servers 104A, 104B, 104C (collectively, servers 104). User devices 102 can be a personal computer, netbook, electronic notebook, smartphone, or any electronic device known in the art that is configured to display web pages. The user devices 102 can include a network interface 106 that is communicatively coupled to a network 108, such as the Internet.

Each social network server 104 can be communicatively coupled to the network 108 and locally with respect to one another. Each server 104 can be an individual server or a cluster of servers, and, in various examples, the servers 104 can be consolidated on a single platform. The servers 104 can be configured to perform activities related to serving the social network, such as storing social network information, processing social network information according to scripts and software applications, transmitting information to present social network information to users of the social network, and receive information from users of the social network. The server 104 can include one or more electronic data storage devices, such as a hard drive, and can include a processor. The social network server 104 can store information related to members of the social network. For instance, for an individual person, the member's information can include name, age, gender, profession, location, activities, likes and dislikes, and so forth. For an organization, such as a company, the information can include name, offered products for sale, available job postings, organizational interests, forthcoming activities, and the like.

The servers 104 variously include components and platforms suitable to server the social network. One or more of the servers includes a unified social content platform 110, a processor 112, a targeted social content platform 114, a database 116, and a transmitter 118 configured to transmit data to user devices 102 via the network 106. The unified social content platform 110 can store and access social network information on the electronic storage devices, can reside on the electronic storage devices, and can utilize or be provided by the processor. The targeted sponsored content platform 114 can provision content according to a sponsored content campaign. The database 116 can store information related to the social network, such as to the provision of the sponsored content campaign.

While the servers 104 are illustrated as incorporating particular elements 110, 112, 114, 116, it is to be recognized and understood that system 100 may incorporate servers 104 having a variety of elements 110, 112, 114, 116. In various examples, the unified social content platform 110 is provided on multiple servers 104 or each server 104, or may be provided on a server 104 that does not incorporate, for instance, the targeted sponsored content platform 114 or the database 116. Similarly, the database 116 may be located in multiple servers 104 or may be located in server 104 separate to that of an instance of the targeted sponsored content platform.

Figure 2:
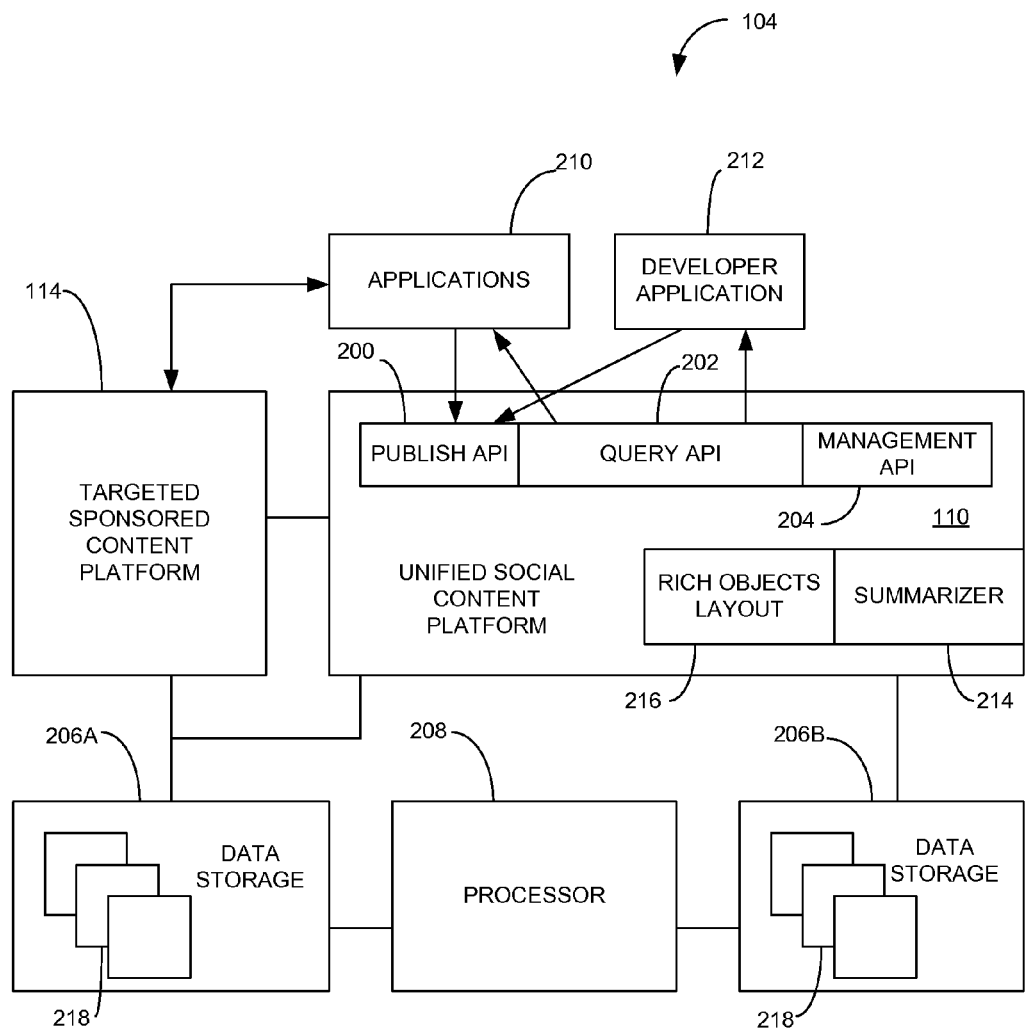
FIG. 2 is a block diagram of a server.

FIG. 2 is a block diagram of an example server 104. As noted above, it is emphasized that the servers 104 generally may include or not include various elements described herein. The server includes the unified social content platform 110 and the targeted sponsored content platform 114. In the illustrated example, the unified social content platform 110 includes a publish application programming interface (API) 200, a query API 202, and a management API 204. In the illustrated example, the electronic data storage 206 of the server 104 provides storage for the unified social content platform 110 but is not itself part of the unified social content platform 110. In the illustrated example, the processor 208 of the server 104 provides processing for provisioning data provided by the unified social content platform 110 but is not itself part of the unified social content platform 110. In alternative examples, the electronic data storage 206 and the processor 208 are components, in whole or in part, of the uniform social content platform 110.

In various examples, the electronic data storage 206 can be or can include an electronic data index in addition to durable storage of data files either for long term storage for dormant files or for files actively utilized by the unified social content platform 110. In various examples, the electronic data index can be utilized for searching functions, such as to identify files without necessarily accessing the files during the search. In various examples, the electronic data index is non-durable data storage, in that the index merely includes information relating to files rather than the files themselves.

The social network server 104 can store information in the electronic data storage 206 related to users of the social network, such as in the form of user characteristics corresponding to individual users of the social network. For instance, for an individual user, the user's characteristics can include one or profile data points, including, for instance, name, age, gender, profession, prior work history or experience, educational achievement, location, citizenship status, leisure activities, likes and dislikes, and so forth. The user's characteristics can further include behavior or activities within and without the social network, as well as the user's social graph. For an organization, such as a company, the information can include name, offered products for sale, available job postings, organizational interests, forthcoming activities, and the like. For a particular available job posting, the job posting can include a job profile that includes one or more job characteristics, such as, for instance, area of expertise, prior experience, pay grade, residency or immigration status, and the like.

User characteristics described above can generally include user profile characteristics, in that they are typically defined by a single discrete label, such as a number, a place, or a binary status. Characteristics included in user behavior, such as can be identified based on user activity within the social network generally. For instance, a user who engages in job searches, such as by entering job keywords into a search engine either of the social network or independent of the social network, can be deemed to have characteristics such as currently seeking a job, and job characteristics that the user is seeking, such as job field, pay grade, location, and the like. Additional user behavior or activities, such as messages to job recruiters, job applications filled out or submitted, and messages to particular companies can also be incorporated. As such, user actions both within and without the social network can be utilized to determine user characteristics such as user behavior.

Activity and behavioral data can be obtained by monitoring and tracking the interactions that a user has with various applications, services and/or content that are provided by, or, integrated or otherwise associated with, the social network service. For example, a social network service may provide any number and variety of applications and/or services with which a member interacts. Similarly, a variety of third-party applications and services may leverage various aspects of the social network service, for example, via one or more application programming interfaces (APIs). A few examples of such applications or services include: search engine applications and services, content sharing and recommendation applications (e.g., photos, videos, music, hyperlinks, slide-show presentations, articles, etc.), job posting and job recommendation applications and services, calendar management applications and services, contact management and address book applications and services, candidate recruiting applications and services, travel and itinerary planning applications and services, and many more.

Analysis of social graph data may signal a member's interest in various job profiles. For instance, in some examples, by analyzing certain social graph data, characteristics can be identified that are suggestive of active job-seeking activity. For example, members who are actively seeking particular jobs may be more likely to follow other members of the social network service, or establish new connections with other members in a very concentrated or shortened time span—particularly other members who are job recruiters for particular job types, or who are associated with a job recruiting function. Similarly, members who are actively seeking jobs of a particular type may be more likely to follow certain companies at which there are open job positions matching the member's skills, or having the same job title as may be desired by the member. Members who are actively seeking particular job types may be more likely to join certain online groups—particularly those groups that exist primarily to aid job seekers. Accordingly, by analyzing social graph data to identify the entities with which a member is establishing associations or connections, and the timing and frequency of the activity, the job-seeking intentions of a member may be inferred, and used in the derivation of a metric representing the member's job-seeking propensity.

In the illustrated example, the server 104 includes social network applications 210, such as can interface with, provide, and obtain social network information from the user devices 102 and other sources. The server 104 further includes a developer application 212 configured to allow administrators or developers of the social network to register new criteria for the unified social content platform 110 to provide information on the social network, as disclosed herein. The developer application 212 can include or access a user interface and can access the publish API 200 and the query API 202. The developer application 212 can allow a developer to create custom social network applications while also adhering to a substantially uniform aesthetic and front end rendering. The uniform social content platform 110 can publish developed applications to the social network substantially immediately.

The unified social content platform 110 can include a data model that includes standard fields that can be applied across social network applications and activities. The data model can include standard fields such as a destination and a visibility of an application. The data model can further include a data field for user defined fields, such as can be provided by a developer via the developer application 212 or by a user of the social network.

The publishing API 200 can be called by an application to publish activity to the unified social content platform 110. Published applications 210 can be queried by at least the unified social content platform 110 and identified to a user, such as via the developer application 212. Upon being published, the applications can also be sent to a pipeline to be provisioned to the user devices 102 via the social network.

The processor 208 can manage the pipeline, such as with dedicated pipeline software. The processor 208 can attach data onto activity items that are provided, such as by applications 210, to the user devices 102 via the social network. Such data can include summaries of users, such as users acting on the applications 210, and objects in an activity. In an example, if the actor is a member of the social network then the actor's name, profile picture or profile picture uniform resource locator (URL), and/or other data regarding the member of the social network. In an example, if the object of the action is a webpage, a summary of the web page can be attached. The processor 208 can also be configured, such as within its pipelining functionality, to store an activity to a long term electronic storage 206a, provide a search term to a search index in electronic storage 206b, tally an activity index count, and send an event notification to offline storage.

The unified social content platform 110 can further include a summarizer module 214. The summarizer module 214 can identify a body of an activity item. The body can include a subject, verb, and/or object of the activity item. The body can be provided for searching of activities, with the body providing certain commonly-sought data points for typical searches. The summarizer module 214 can be included in a language-translated or translatable format for searching in various languages. The summarizer module 214 can annotate the body with the location of entities so that the entities can be highlighted and/or hyperlinked by a renderer. Annotations can identify the text that is annotated by start and end offset indices.

The body of the activity items generated by the unified social content platform 110 can be common among all applications. The user devices 102 can be configured to render activities transmitted from the unified social content platform 110 without having to be separately configured for different applications. The content summary can accompany the body in an activity. The body and the content summary can be utilized to create consistent content displays and developer applications. The body can be annotated with semantic regions, allowing users and developers to tailor the display of bodies based on the context. In an example, if a particular company is mentioned in a body, the annotation can indicate to a user device 102 to generate and/or display a profile of the company.

The summarizer module 214 can, in certain examples, create a body for display, such as upon having identified the body. The summarizer module 214 can decorate an activity view, such as on a user device 102, with locale-dependent views of entities, such as members, companies, and so forth. The summarizer module 214 can render a template according to context and dedicated helper functions. Upon rendering, a fully formed body string can be displayed within a display region to show the body.

The unified social content platform 110 can optionally include additional APIs or templates for certain dedicated tasks. The unified social content platform 110 can include a query template for regularizing queries of stored materials. In an example, the unified social content platform 110 can include rendering templates that can be used in cross-platform applications. Such cross-platform applications can include as aspects of the social network that is not necessarily provided by the unified social content platform 110. The rendering templates can be built and registered via the developer application 212. Applications may select between and among the rendering templates for use with activity items.

In an example, the social content platform 110 includes a comment API to append comments to activities or other material managed by the unified social content platform 110. The comment API can optionally create discussion threads upon the establishment of a comment. Comments can be aggregated with other activity data, such as social gestures such as indications that a user likes an activity or content.

The processor 208 can provision a pipeline to transmit applications generated by the unified social content platform 110 to the social network generally, such as to be displayed on a user device 102. The pipelining process can utilize a rich objects layout block 216 to convert conventional text into presentational layouts that include graphics, stylized text, and so forth. The rich objects layout block 216 can be provided by the processor 208 or can be provided by dedicated resources, such as processors and electronic memory. The pipeline provided by the processor 208 can further provide storage and indexing of applications, in various examples with or without rich object layouts. The pipeline can be accessible to other applications being generated in the unified social content platform 110 and, in various examples, elsewhere in the system 100, allowing applications in the pipeline to be utilized for other development purposes. The system 100 generally, and in various examples the unified social content platform 110 specifically, can incorporate pipeline monitoring functionality to identify applications in the pipeline, such as by according to a unique identifier.

As noted above, a social network can incorporate various discretely implemented data structures or subsystems in which various types of social network information is provided or stored. For instance, in certain examples, separate databases may store, index, and provide different types information, such as employment characteristics of a member, user activities, the advertisements. In an example, databases 218 in the electronic data storage 206 generally, and in both the long term electronic storage 206A and the search index 206B in various examples, separately store and provision various informational aspects of the social network.

In various examples, the information stored in one database 218 is not directly compatible with respect to information stored in another database 218. Information stored in one database 218 may, for instance, incorporate different types and formats of data fields, resulting in an inability to store information from one database 218 in another database 218. Each database 218 may be independently and separately search for relevant information. Thus, a search for all information related to a particular member of the social network, for instance, may be conducted in each individual database 218, with each database 218 separately returning information related to the member. In some examples, the unified social content platform 110 can be configured to convert information of the same or related type into a uniform format for use by the system 100. In that way, the unified social content platform 110 can serve to translate between individual databases 218 and the rest of the system 100.

In various examples, contrary to the above examples, the electronic data storage 206 is a component of the unified social content platform 110. In such an example, the functionality of the unified social content platform 110 serves to provide a uniform structure for some or all storage of social network information in the electronic data storage 206. In certain such examples, though data may be stored and organized in separate databases, the data structures of some or all of the databases may be uniform and not require translation or manipulation for use by the rest of the system 100.

The unified social content platform 110 can include, in the case of incorporating the electronic data storage 206 directly, or manipulate, in the case of translating from incompatible databases 218, profiles of members of the social network that include characteristics of the members, the social graph of the members of the social network, and content summaries of applications. The social graph data may be remote to the server 104 or to the social network generally, such as by incorporating distributed social graph information from multiple sources outside of the social network. Such distributed social graph information can be accessed as part of a query execution. These data can include dependent data. In an example, the member profiles can include fields indicating characteristics, such as: member activity; a member age bracket; whether member connections are allowed; whether an open link is allowed by the member; member group information; member connections; member country; a date the member registered with the social network; a default locale; a member profile viewer; a member web profile; various member group exclusions; a member name; a member gender; a member social generation; a member time zone or time zone offset; a member job industry; a identification of an inviter of the member to the social network; a time the member last checked the social network; a last time the member logged in to the social network; a member name preference; a member geographic location; a member unique identifier; a member picture; a member email address; a member status; a member postal code; a preferred member locale; a number of social network proposals accepted by the member; a member region; whether the member requires or required referral to the social network or functions of the social network; member restrictions; a member state; a member social network subscription plan; a member vanity name; a web profile setting, and a member age.

The unified social content platform 110 can incorporate as an organic block or call as a separate block a targeted sponsored content platform 114. The targeted sponsored content platform 114 can be configured to select various forms of sponsored social network content for displaying to particular users and members of the social network based on various criteria, as disclosed herein. In various examples, the targeted sponsored content platform 114 functions as or incorporates a recommendation engine as disclosed below to compare a sponsored content profile against a user or member profile in conjunction with a sponsored content bid entered by an entity providing the sponsored content. In various examples, the targeted sponsored content platform 114 can fully constitute the recommendation engine as disclosed below. The targeted sponsored content platform 114 can incorporate input from the unified social content platform 110, such as output from separate recommendation engine analysis of the content of individual databases 218, such as for recommended organic content. Additionally or alternatively, the targeted sponsored content platform 114 can incorporate input directly from applications 210, data storage 206A, and from other sources such as from user devices 102. In that way, the targeted sponsored content platform 114 can consolidate multiple items of recommended content, such as recommended organic content from individual databases 218 as well as sponsored content, into an overall recommended content presentation for a user of the social network.

In various examples, the unified social content platform 110 can be wholly or substantially self-contained/sufficient. In various examples, the unified social content platform 110 does not make "sideways" calls to another equivalently-tiered block. Rather, like certain super blocks known in the art, the unified social content platform 110 can, in certain examples, make calls "down" to general infrastructure blocks. Such infrastructure blocks can include the electronic data storage 206, certain functions that may be provided by the processor 208, such as the pipelining function. "Cloud" computing functions known in the art can be included as infrastructure.

In various examples, equivalent mid-tier calls can be made by the unified social content platform 110 to other mid-tier or super blocks. In an example, another block of an equivalent or approximately equivalent tier (such as, in various examples discussed herein) to the targeted sponsored content platform 114, to the uniform social content platform 110 can provide proxy calls to the unified social content platform 110. In such an example, various services can provide data to decorate onto the result of the proxy call. Alternatively, the unified social content platform 110 can monitor streaming data from mid-tier or super blocks and maintain read-only replicas of data from the other mid-tier or super blocks.

The unified social content platform 110 can be published with extension points or service provider interfaces (SPI). The unified social content platform 110 can be published as a raw schema and/or as a dedicated client library with an SPI including interfaces that can be implemented to the unified social content platform 110 as well as to the schemas to, for instance, permit the addition of processing elements to the processor 208. The APIs and SPIs of the system 100 generally can be built as independent tasks.

Figure 3:
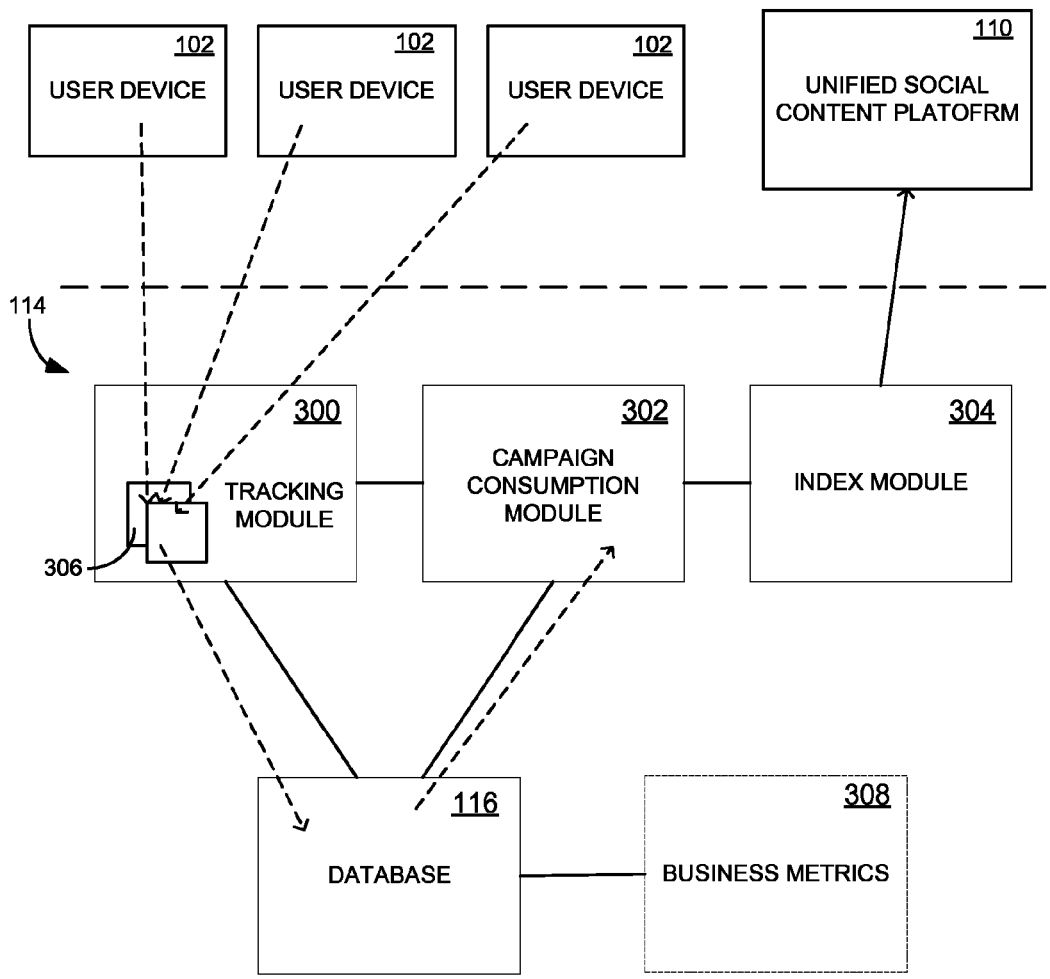
FIG. 3 is a block diagram of an example of a targeted sponsored content platform and associated elements of a system.

FIG. 3 is a block diagram of an example of the targeted sponsored content platform 114 and associated elements of the system 100. As noted above, the targeted sponsored content platform 114 may include or function as a recommendation engine to provide sponsored content to particular users as appropriate to the user's characteristics, as disclosed herein. Additionally, the targeted sponsored content platform 114 may include mechanism to manage sponsored content campaigns between and among multiple servers 104 that incorporate individual instances of the targeted sponsored content platform 114.

At least some, and in various examples all of the targeted sponsored content platforms 114 are capable of separately executing a sponsored content campaign where the campaign itself extends across multiple targeted sponsored content platforms 114. As will be discussed in detail below, each targeted sponsored content platform 114 may be configured to maintain data as received by the targeted sponsored content platform 114 itself, receive updates from other targeted sponsored content platforms 114, and anticipate events related to the sponsored content campaign likely received by the other targeted sponsored content platforms 114 between or in absence of updates. As such, each targeted sponsored content platform 114 may separately manage a sponsored content campaign and, once a campaign termination condition would likely have been met across the system 100 as a whole, terminate the sponsored content campaign as implemented by the individual targeted sponsored content platform 114.

The targeted sponsored content platform 114 incorporates a tracking module 300, a campaign consumption module 302, an index module 304, and, in the illustrated example, the database 116. It is to be understood that the database 116 may be one of the databases 218 or, as illustrated, may be separately provisioned for the purposes of storing data related, at least in part, to sponsored content campaigns. It is to be understood that the database 116 is not necessarily included as a part of certain targeted sponsored content platforms 114.

The tracking module 300 may manage the transmission of sponsored content event data 306, such as display of sponsored content to a user on a user device 102 or a user interaction with the content, such as by clicking on a sponsored link. The tracking module may perform various aspects of sponsored content event data 306 tracking, including but not limited to monitoring and decrypting data sent from the user devices 102 related to interaction with sponsored content, buffering such information, and storing the sponsored content event data 306 information as a packet in the database 116 or other electronic data storage. The tracking module 300 may also perform error checking and manage the resending of corrupt information, de-duplication of sponsored content event data 306 information, and validation of such information, such as may be utilized to identify potentially fraudulent sponsored content event data 306 information.

Figure 4A:
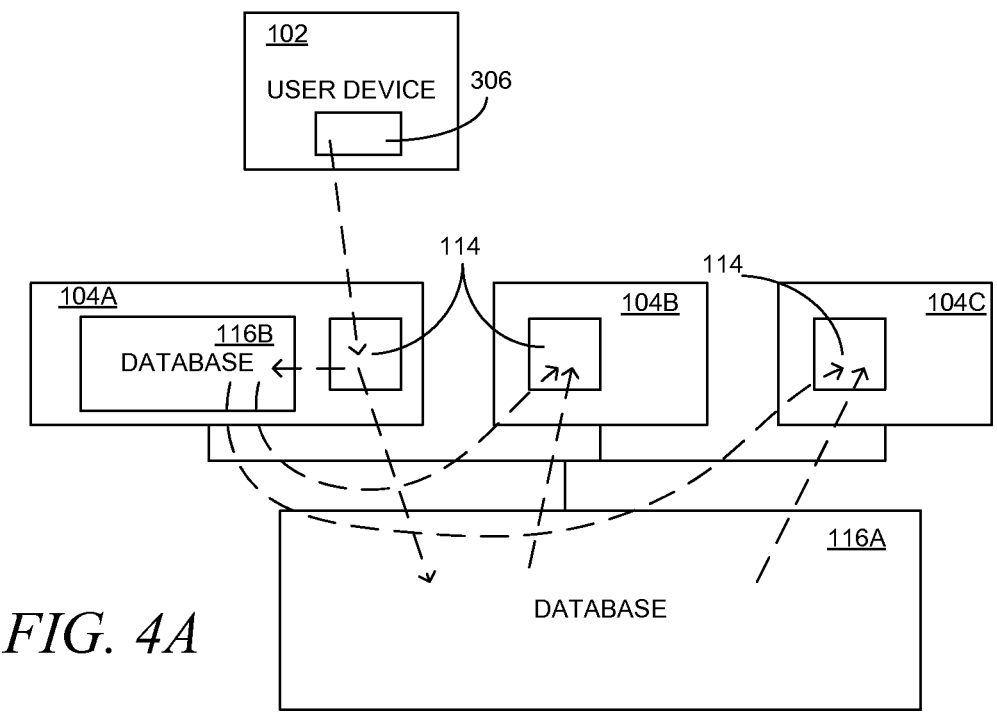
FIGS. 4A and 4B are simplified illustrations of a system utilizing partitions in the database.
Figure 4B:
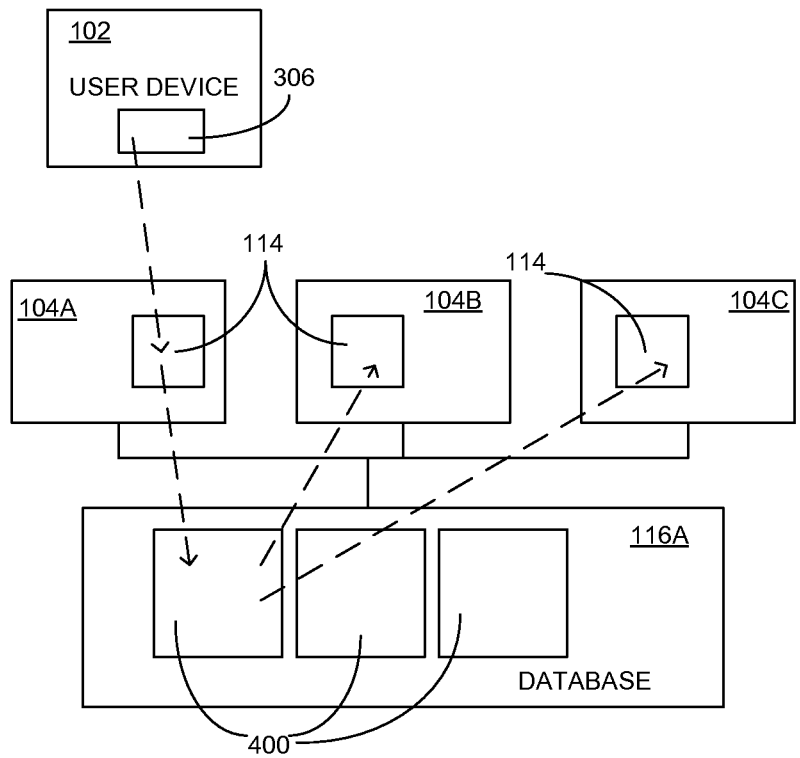

FIGS. 4A and 4B are simplified illustrations of the system 100 utilizing partitions 400 in the database 116, such as may be utilized to promote management of sponsored content event data 306 as received from the user devices 102. The database 116 may be a general database 116A or a local database 116B. The tracking module 300 may obtain information from the user devices 102. The partitions 400 may support the streaming of relatively large amounts of information from the tracking modules 300. Each partition 400 may be separately buffered by the corresponding tracking module 300.

In one example illustrated in FIG. 4A, the tracking module 300 may direct sponsored content event data 306 related to a campaign or entity provided on its corresponding server 104 directly to the local database 116B while forwarding all information to the general data base 116A. Consequently, each targeted sponsored content platform 114 may be subject to receiving sponsored content event data 306 from some or all of the sponsored content campaigns operated by the system 100. Consequently, the sharing of sponsored content event data 306 between targeted sponsored content platforms 114, such as via the database 116, may facilitate the individual targeted sponsored content platforms 114 managing the various campaigns, as disclosed herein.

In another example illustrated in FIG. 4B, each partition 400 corresponds to an individual sponsoring entity, with each entity corresponding to one partition 400. In various alternative examples, each partition 400 corresponds to one or more sponsored content campaigns. Sponsored content event data 306 may be directed to the partition 400 corresponding to the event's campaign, such as by comparing the campaign identifier and/or the sponsoring entity identifier of the sponsored content event data 306 as disclosed herein. From there, the partition 400 may provide the sponsored content event data 306 to the targeted sponsored content platform 114 corresponding to the partition 400.

The tracking module 300 may discriminate between various types of sponsored content event data 306. For instance, simply because a piece of sponsored content is served to a user device 102 does not necessarily mean that the sponsored content will be presented to a user. Rather, the sponsored content may simply be pre-fetched and/or cached for future viewing. In various examples, the tracking module 300 may incorporate data, such as from the user device 100 and/or the unified social content platform 110 and the system 100 generally to identify whether a sponsored content item has been served to a user device 102 but not displayed to a user.

Additionally, the tracking module 300 may compensate for lag or delay in registering sponsored content event data 306, such as may occur due to delays in transmitting such events from the user device 102. In various examples, the serving history of various sponsored content event data 306 may be obtained from the unified social content platform 110 and parsed according to the identification of the member of the social network associated with the user device 102. The history may be utilized to identify likely occurrences of a social content event without having actually received the event itself. In various examples, the history of a likely event may be utilized for one (1) minute or less after the serving of the sponsored content event data 306.

For de-duplication, the tracking module 300, each serving of a sponsored content item may be registered by a unique identifier, such as from the unified social content engine 110. Sponsored content event data 306 as transmitted from the user devices 102 may include the unique identifier of the corresponding sponsored content item. The tracking module 300 may compare the unique identifier of the sponsored content item as served against the identifier of the sponsored content event data 306 received from the user device 102 and register only a maximum number of events for each item. In various examples, the maximum number of events per item is configurable based on the nature of the item. The targeted sponsored content platforms 114 may share sponsored content event data 306 for cross-engine 114 de-duplication. In various examples, de-duplicating may be applied to an entire packet from the buffering function disclosed above. In such an example, it may be assumed that a duplicate sponsored content event data 306 obtained from a buffered packet means that the entire packet is a duplicate and can be discarded.

The database 116 may be horizontally scalable, partitioned, and document-oriented. The database 116 may be partitioned according to any of a variety of factors. In an example, the database 116 is partitioned according to a unique identifier of each entity that is currently running or, in various examples, has run a sponsored content campaign. Sponsored content event data 306 may incorporate the entity identifier in addition to the identifier related to the sponsored content item, as disclosed above. In various examples, each partition may store information relating to only one (1) entity or may store information relating to multiple entities.

Data stored in the database 116 may also include an identifier related to the individual targeted sponsored content platform 114 from which the data was obtained. The platform identifiers may be utilized to facilitate the sharing of data between platforms 114, such as to allow various platforms 114 to anticipate the operation of sponsored content campaigns on other platforms 114.

The database may be utilized to produce reports relating to a sponsored content campaign. One report may detail the type of events corresponding to a sponsoring entity or particular campaign and may include: a report date; a sponsoring entity identifier; a campaign identifier; a sponsored content item identifier; a number of events that correspond to sponsored content items being displayed to a user on the user device; a number of events that correspond to a user selection of a sponsored content item; a number of events that result in a conversion for the purpose for which the sponsored content item was presented (e.g., a sale from an advertisement or a new member for an organization, etc.); and a total campaign cost. One report may provide detail on user selections of the sponsored content items and may include: a report date; a sponsoring entity identifier; a campaign identifier; a sponsored content item identifier; a number of events that correspond to sponsored content items being displayed to a user on the user device; the types of user selections of sponsored content items (e.g., a dismissal of the content, a click-through on a link, etc.); and data relating to the interaction (e.g., the timing of a click of a link following initially presenting the link to the user, the number of clicks of the link, etc.). Other reports are contemplated, including relating to metadata related to the campaign.

The tracking module 300 may transmit data to the database 116 according to a variety of processes and schedules. In an example, the tracking module 300 regularly transmits sponsored content event data 306 as the data is acquired, in contrast, for instance, to batch transmissions. Transmission of data may be according to multiple threads that may be coordinated to provide data to the database 116 at a maximum rate to control the write rate to the database 116.

The campaign consumption module 302 may track each sponsored content campaign according to one or more campaign completion criteria. The campaign completion criteria may be based on a completion of the campaign overall and/or over a predetermined time period, such as one (1) day or twenty-four (24) hour period. Thus, the campaign consumption module 302 may track the extent to which a campaign is presented to users of the social network and, based on that presentation, continue the campaign, terminate or suspend the campaign temporarily until a predetermined time period has passed (e.g., the one-day period has passed or a rolling number of sponsored content event data 306 that have occurred within a twenty-four (24) hour period has fallen below a threshold), or terminate the campaign altogether.

In various examples, a campaign consumption module 302 may serve as a master module for one partition 400. Additionally or alternatively, the campaign consumption module 302 may operate as a backup or secondary module for one or more different partitions 400. The processing capacity for each partition 400, such as may be provided by the processor 112, may manage which campaign consumption module 302 acts as primary module for the partition 400, or the management of the campaign consumption module 302 and partition 400 pairings may occur based on processing throughout the system 100. Each partition 400 individually or the system 100 generally, such as via the database 116, may maintain a log or report of sponsored content event data 306 that has been processed by each partition 400 over a preceding period of time, such as thirty (30) second to thirty (30) minutes, to facilitate the transfer of primary responsibility of a partition 400 from one campaign consumption module 302 to another campaign consumption module 302. Such a log may provide for de-duplication and other data that may be utilized in the maintenance of the sponsored content campaigns.

Events as stored in the database 116 may be transmitted to the campaign consumption module 302 as a batch. In various examples, there is a one-to-one relationship between campaign consumption modules 302 and databases 116. Alternatively, a database 116 may provide data to multiple campaign consumption modules 302 according to the partition 400 to which the campaign consumption module 302 corresponds as the primary module.

The campaign consumption module 302 may monitor the budget corresponding to each of the campaigns provided by the system 100. As noted above, campaigns may be based on a lifetime budget and/or a budget over a particular sub-period of the lifetime, such as one (day), one (1) week, one (1) month, or a variety of other time periods as would be apparent. The campaign consumption module 302 may monitor both the budget for a particular campaign as well as the budget for a sponsoring entity. Thus, if, for instance, an entity has multiple campaigns, each with a budget, as well as a budget for the entity as a whole, exceeding the budget for a particular campaign may terminate or suspend that particular campaign, or exceeding the budget for the entity may result in the termination or suspension of all of the campaigns corresponding to the entity.

The campaign consumption module 302 may receive sponsored content event data 306 from the database 116 and update the statistics related to campaign and sponsoring entity budgets accordingly. In an example, according to a particular campaign, a presentation of a sponsored content item on a user device 102 may correspond to a first cost, a user interaction with a sponsored content item may correspond to a second cost, and so forth. On the basis of the sponsored content event data 306 as obtained by the tracking module 300 and stored in the database 116, the campaign consumption module 302 may determine the total cost that may be applied to the budget for the campaign and/or entity.

The campaign consumption module 302 may check campaign parameters periodically, such as once per minute, to determine if a campaign termination criterion has been met. Such checking may include determining if external factors relating to the campaign parameters, such as the passage of time, have changed, such as if a new day/week/month has begun, in which case campaign and/or entity tracking may be reset for the corresponding time period. Alternatively or additionally, the campaign consumption module 302 may check campaign parameters on the basis of receiving predetermined sponsored content event data 306. In such an example, the campaign parameters and related external factors may be checked when a received sponsored content event data 306 indicates that a user has interacted with a sponsored content item as disclosed herein.

In addition to determining campaign termination conditions, the campaign consumption module 302 may also utilize sponsored content data to monitor minimum criteria for campaigns. In various examples, campaigns may require both a maximum budget as well as a minimum amount of exposure of sponsored content from the campaign, such as over a predetermined time period, such as one (1) day. The campaign consumption module 302 may monitor the number of sponsored content event data 306 of various types to determine if campaign minimum criteria are being met.

In an example, a campaign may set a minimum number of displays of sponsored content items on the user devices 102. A campaign may also set a goal of a predetermined number of interactions with and/or conversions of sponsored content items, as detailed herein. The campaign consumption module 302 may monitor such sponsored content event data 306, either generally or specific to the types of events. The campaign consumption module 302 may provide periodic reports relating to the meeting of campaign minimums and/or may provide alerts if the campaign minimums are not being met. On the basis of the reports and/or alerts, the targeted sponsored content platform 114 generally may increase a likelihood of a sponsored content item being transmitted to a particular user device 102, as disclosed herein.

Figure 5:
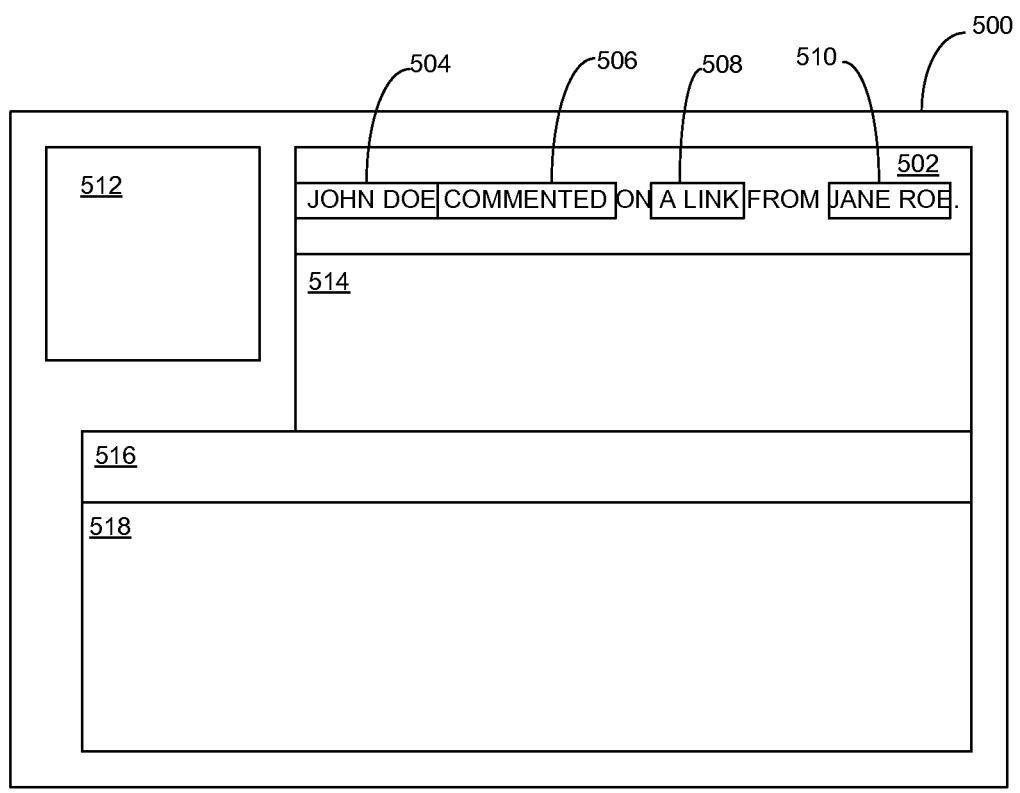
FIG. 5 is a block diagram of a user interface screen displaying an activity provided by a uniform social content platform.

FIG. 5 is a block diagram of a user interface screen 500 displaying an activity provided by the uniform social content platform 110. The user interface screen 500 can be provided on the client devices 102 to the extent that a user account on the social network that corresponds to the activity in question is accessed on the client device 102. In an example, the screen 500 can display an activity statement according to an actor-verb-object format disclosed herein. In alternative examples, different formatting selections can be generated via the unified social content platform 110.

The screen includes a body 502 of an activity as generated by the summarizer module 214. The illustrative example body 502 includes an actor field 504, a verb field 506, an object field 508, and an attributed entity field 510. The unified social content platform 110 can include text to link together the body fields 504, 506, 508, 510 into a grammatically coherent way. The linking text can be included by a developer, such as via the developer application 212 in the development of the pertinent application, or according to an engine of the unified social content platform 110 that can generate appropriate and substantially grammatically correct phrases.

The actor can be an entity that initiated the activity that is the current subject of the screen 500. The actor can be a person or a company, or any entity that can be identified. The verb can be a complex type registered with an application 210. Registration can be based on a user selection via the developer application 212 and can be changed dynamically. Conjugation can be specified by the developer when the verb is registered. A registered verb may also define custom properties by specifying each property's name and type. When a developer publishes an activity, the publisher can spicy the verb and provide values for various properties. Development comments can be appended to verbs in various examples.

The object is an entity acted upon by an activity statement. The object can be an entity that has an identifier. The object can be an entity identified by a URL. The object can be an entity that can be summarized with a title and variously a description, an image, and a URL from a publisher of the object. In various examples, an activity can not include an object and can be referred to as a "post".

The object can take the form of a "target". The target can be utilized where the object is part of a larger class. For instance, "X applied for a job at Y" provides Y as an example of a target, where Y is a specific company.

An attributed activity or application can be the originator of the activity. The attributed activity can be provided where the actor of the activity is not the entity that originated the activity. In an exemplary format, "X shared a link from Y" where X and Y are both actors provides an attributed activity.

Standard and custom actions can be available for an activity. Additional actions may be provided by a publisher or developer once the action is registered with the developer application 212. In query results, standard and custom actions can be attached to pertinent activities, and in an example to each pertinent activity, for rendering.

Custom properties may be defined for verbs and objects. Once defined, can activity can be published with the properties. On output, comments and counts of other social actions can be attached to each activity to facilitate rendering the comments and counts can be rendered inline with the activities. Similar activities can be grouped into common families according to a selectable data field of the activity. Annotations can allow semantic regions of text to be marked up upon displaying an activity.

Verbs, objects, and other data types disclosed herein can be customized. Data types can be primitive or complex according to their number of customizable properties. Properties can be utilized to specify data type layout on the screen 500, such as according to syntax and appearance. The develop application 212 can be utilized to customize such properties. The properties can be selectable and customizable according to standard protocols known in the art or according to proprietary protocols.

The user interface screen 500 can include additional information, such as that can be included on social network web sites. An image 512 can provide an image chosen by or indicative of a user of the social network or an entity providing content to the social network. A content rendering section 514 can display information, such as a status update, an article, a web link, and other social network content. A call to action section 516 can provide options for users of the social network to comment on or otherwise interact in a social network context with the content in the rendering section 514. A social summary section 518 can show social network interactions with the content, such as can be conducted by users of the social network in the call to action section 516. For instance, a comment or other use interaction with the content can be displayed in the social summary section 518.

Figure 6:
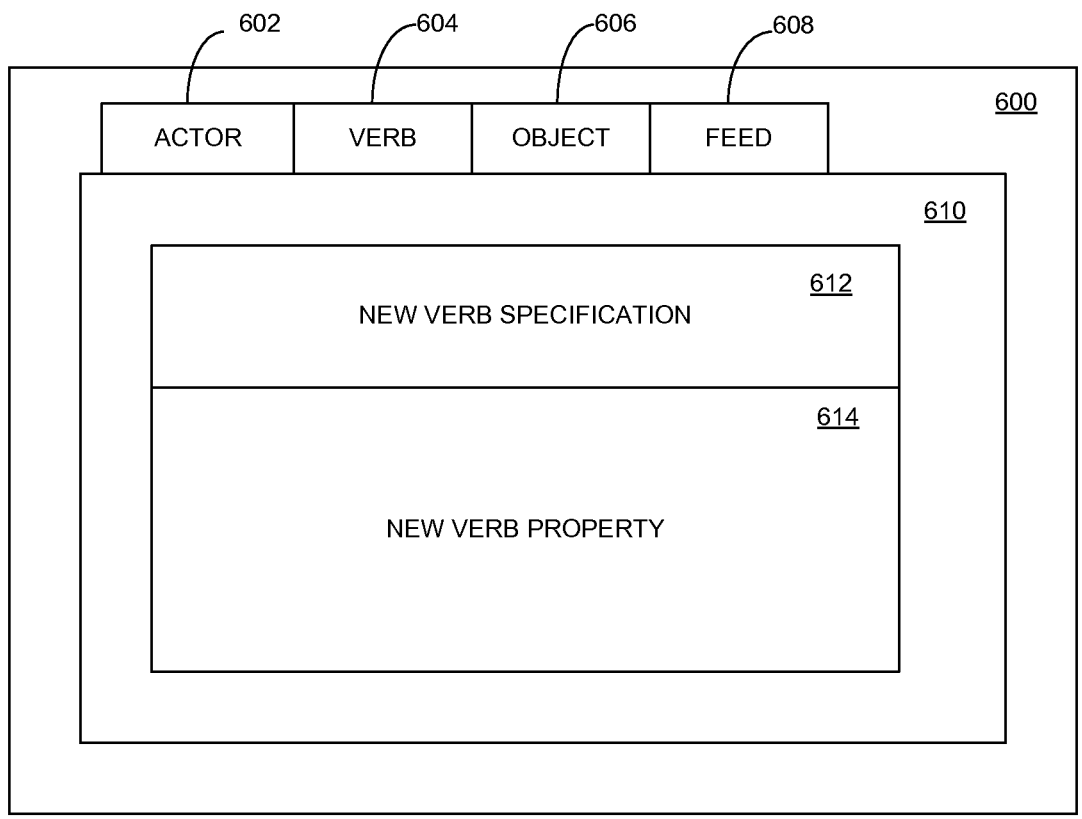
FIG. 6 is a block diagram of a developer application screen for a developer application.

FIG. 6 is a block diagram of a developer application screen 600 for the developer application 212. The user interface screen 600 can be displayed on a conventional display screen such as be a component of or interface with the server 104. The screen 600 can be utilized by a developer to register verbs, objects, custom properties, and the like.

The developer application screen 600 includes menu tabs to select various functions of the developer application 212. The tabs can include an actor creation tab 602, a verb creation tab 604, an object creation tab 606, and a feed creation tab 608. Various tabs 602, 604, 606, 608 can be excluded dependent on operational needs, while additional tabs can be included as needed or as may be convenient. The tabs 602, 604, 606, 608 can be supplemented by or replaced with other conventional menu selections known in the art.

The tabs 602, 604, 606, 608 or other menu options can provide access to corresponding frames, as illustrated a verb creation frame 610 corresponding to the verb creation tab 604. The verb creation frame 610 provides new verb specification field 612 for the specification of the verb, conjugations of the verb, and similar information, and new verb property fields 614, such as can specify activities and applications to which the verb applies. Similar fields 612, 614 for specifying objects and the like can be available on frames corresponding to other tabs 602, 606, 608.

An actor creation frame accessible by the actor creation tab 602 can include fields to specify a name, a namespace and a description of the actor. Each actor can be specified a unique identifier. The actor creation frame can further include fields for actor attribution to specify how an attribution is displayed in an activity body, such as where in a sentence the attribution is displayed (e.g., "X commented on Y via Z"). Actor attribution can be located in a separate frame or be accessible by a separate tab.

The verb creation frame 610 can include fields 612 for an un-conjugated form of the verb, conjugated forms of the verb, and fields 614 for custom properties of the verb. The developer application 212 can provide estimated conjugations of the un-conjugated in the conjugated verb fields that can be subject to editing via the fields 612. The verb creation frame 610 can display an example activity that includes the verb.

An object type creation frame accessible by the object creation tab 606 can provide fields for entering the type of an object, such as a branch, a grammatical article (e.g., "a" or "an") that may, in certain examples, be an estimated article by the developer application 212, and fields to specify a singular and a plural form of the object. Additional fields may provide for the specification of custom properties of the object. Optional templates may be presented and selected for use with the object, as well as a preview of an example activity using the object.

The object type creation frame can further include fields specifying how to treat an object that appears as a target, such as what prepositions to use with respect to the object as a target. In various examples, objects can be referred to by type, such as a general classification of the object, rather than by the object itself. By way of comparison, an "orange" can be specified to be referred to as an "orange" or as a "fruit".

The query type creation frame can be utilized for the creation of a feed, such as in a browsing query language (BQL), as well as to define attributes that are referenced in a query. A preview of the feed for the query can be rendered in the frame and/or saved for future use or application. A unique identifier can be assigned to the feed. Each feed can be assigned a URL. Accessing the URL can display the query utilized to generate the feed.

Various applications and the components of the applications can be made generally accessible to developers who have access to the developer application. Such applications can be generally available and subject to being modified by any developer, such as by locking the application while a developer is making changes and then releasing the application for another developer to make changes. Certain applications can be designated as being not publicly modifiable.

In various examples, the developer application 212 can support the generation of aggregated or consolidated applications. In an example, where multiple entities have acted on the same object, an aggregated application can be generated. (e.g., "X and Y have commented on Z's update.") In an example, where an entity has acted on multiple objects, an aggregated application can be generated. (e.g., "A has joined B and C.") In an example, where an entity has performed multiple actions, a single collapsible and expandable update can be generated. (e.g., "K has commented on L's update," "K is now connected to M," and "K read N's article" can be consolidated to "K has commented on L's update. (+show more from K)") The unified social content platform 110 can be based on indexed search criteria that can return, for instance, all of the activities of a particular entity over a predetermined time period. The unified social content platform 110 can periodically search for entities and objects in the search index to identify pertinent information that can support aggregated or consolidated actions.

Figure 7:
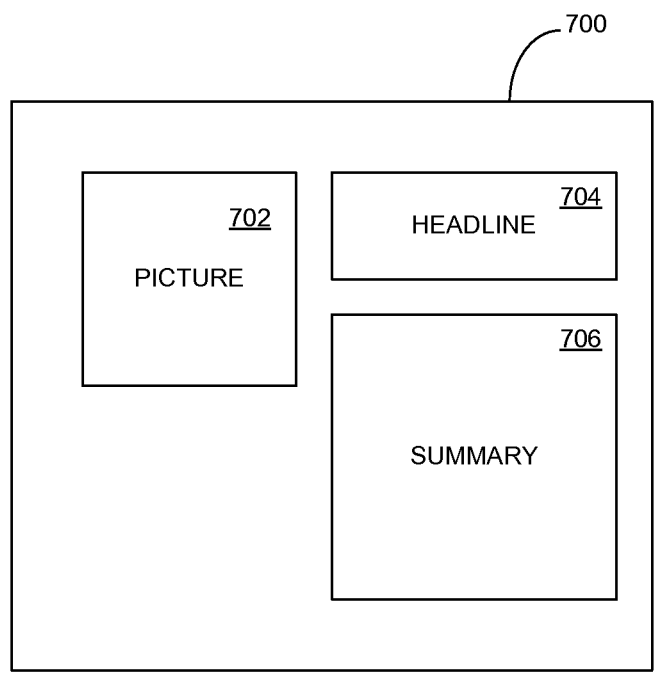
FIG. 7 is an activity rendering screen as can be displayed by a unified social content program.

FIG. 7 is an activity rendering screen 700 as can be displayed by the unified social content program 100, such as by the developer application 212. A developer can utilize the activity rendering screen 700 to develop a model to render an activity with common rich text, images, and so forth, as compared to other activities. The activity rendering screen 700 includes a picture field 702, a headline field 704, and a summary field 706. In various examples, a developer can choose to omit various fields 702, 704, 706.

The model can form the basis for rendering by providing instructions to the client-side, such as the user device 102. The client-side can utilize the model to render the activity. Based on changes promulgated to the client side, upon an updated standard for rendering the model, the rendering itself may be changed and updated without having to change the model or the activity itself.

The unified social content platform 110 can provide multiple models. The number of models may be limited in order to prevent undesired lack of uniformity. However, the number of models may be selectable to permit desired flexibility. Various models can include a basic model that includes one each of the picture field 702, the headline field 704, and the summary field 706. An additional model can include a gallery view that includes multiple picture fields 702 and, in various examples, no summary field 706. A list view model can include an expanded summary field 706, such as includes a bulleted list, and that optionally does not include a picture field 702.

In an example, a developer can chose from among the pre-defined models. For each model, the developer an establish how to fill in each field 702, 704, 706, such as with specified images, bodies, verbs, objects, and so forth. The model can be stored in the electronic data storage 206 as a model schema. Each field can be assess upon return of the model from the electronic data storage 206 for changes in the properties of the items that fill the fields 702, 704, 706.

To conduct rendering, the client-side, such as the client device 102, can be provided with a parser function to transform the body into an appropriate format based on the context of the client device 102, such as whether the client device is a desktop computer, a mobile device, and so forth. The client device 102 can further be provided with a renderer function that can transform the model into the appropriate context. Based on the combination of the body and the model, the client device 102 can render the complete activity in the consistent format established throughout the application of the social network.

Sponsored Content

In various embodiments, the system 100 includes logic, such as in the targeted sponsored content platform 114, that can identify user characteristics that conform to a given sponsored content campaign profile. In various examples, upon receiving a request to identify user characteristics similar to a particular sponsored content campaign profile, the system may analyze a variety of user characteristics to select one or more user characteristics that have the highest aggregate sponsored content scores with respect to the sponsored content campaign profile. The identification can be in real-time, understood to be an analysis that is conducted essentially immediately upon receiving the sponsored content profile. After identifying the most similar user characteristics (e.g., those with the highest aggregate sponsored content scores), the system 100 may transmit information related to the sponsored content to the selected users.

In various examples, the targeted sponsored content platform 114 can generate a list of user characteristics with the highest aggregate sponsored content scores. The list can be presented to a sponsor of the sponsored content. The sponsor can identify users who have user characteristics that are desirable for sending sponsored content to and manually select users of the social network to whom sponsored content can or should be presented.

In various examples, a recommendation service or feature may generate an average user characteristic based on the aggregate user characteristic information of all or some selected users for particular sponsored content. For instance, the recommendation service may select the average user characteristic as an input to the user characteristic matching algorithm, and identify user characteristics that are similar to the model sponsored content profile for the sponsored content campaign. For each user characteristic that is determined to be similar to the average user characteristic for a particular sponsored content, the targeted sponsored content platform 114 may recommend to a user having a user characteristic similar to the sponsored content profile for the instant sponsored content, that the user be presented with the sponsored content if the user has not already been so presented.

The ability to accurately identify in real-time or essentially real-time a set of user characteristics most similar to a sponsored content profile (or, in various examples, a set of company profiles most similar to a user characteristic) can be achieved with a general recommendation engine of the targeted sponsored content platform 114. Accordingly, at least in some examples, the recommendation engine provides a recommendation service that can be customized for use with multiple applications or services. A recommendation entity can be a collection of information organized around a particular concept that is supported by the system 100 in general, and the recommendation engine in particular. For instance, some examples of recommendation entities are: user characteristics, interest groups, companies, advertisements, events, news, discussions, text posts, short form posts, questions and answers, and so forth. Accordingly, in some examples, by specifying the particular characteristics of two recommendation entities to be compared, and by specifying a particular algorithm for use in generating an aggregate score, such as in the instant example an aggregate company score, for the two recommendation entities, the recommendation engine can be configured and customized to perform such tasks as: generate aggregate sponsored content scores for use in presenting sponsored content to a user; generate aggregate sponsored content scores for use in recommending particular interest groups that a user might be interested in joining; generate aggregate sponsored content scores for use in displaying an appropriate or relevant advertisement to a particular user, and many others.

In an example, the recommendation engine operates in two phases. In the first phase, the data representing each individual instance of a particular recommendation entity, such as the user characteristics and the sponsored content characteristic, is processed by a characteristic extraction engine to extract the relevant characteristics on which matching analysis is to be performed. In various examples, in the case of user characteristics, only certain characteristics or portions of a user's characteristics may be selected for use in determining the similarity of any two profiles, such as the user characteristics and a sponsored content profile. As such, during the first phase, a characteristic extraction engine processes each user characteristic to extract the relevant characteristics, including profile characteristics, behavior characteristics, and social graph characteristics. In addition to simply extracting certain characteristics from relevant recommendation entities, the characteristic extraction engine may derive certain characteristics based on other information included in the recommendation entity, such as from the user characteristics.

In various examples, user characteristics can be obtained inferentially. In one example, one characteristic that may be used to identify similarities between user characteristics and a sponsored content profile is work experience. Work experience may included as a characteristic in user characteristics directly or may be arrived at indirectly, such as by being measured in the number of years since a user graduated from a selected educational institution or achieved a particular educational level. While work experience, in an example, may not be included as raw data in a user's characteristics, it may be derived with a calculation if the user's graduation date is specified in the user's characteristics. In addition, in some examples, the characteristic extraction engine may standardize and/or normalize various characteristics, such as a user's sponsored content or position title, or the name of a company at which a user has indicated being employed. In some examples, certain characteristics may be retrieved from external data sources, using other information included in the recommendation entity as part of a query to the external data source.

The first phase may occur in real-time or as a background operation, such as offline or as part of a batch process. In some examples that incorporate relatively large amounts of data to be processed, the first phase may be achieved via a parallel or distributed computing platform. Once the relevant characteristics have been extracted, computed, derived, or retrieved, relevant characteristics of the one or more selected users or sponsored contents can be stored as a pre-processed recommendation entity. For instance, in the case of user characteristics, the characteristic extraction process can result in enhanced user characteristics that includes only the relevant characteristics extracted from a user's characteristics as well as any derived or retrieved characteristics. The enhanced characteristics can be used during the recommendation engine's second phase, when the matching engine compares the relevant characteristics from the sponsored content profile against each user characteristic until those user characteristics with the highest aggregate sponsored content scores are identified.

In an example, during the second phase, the matching engine of the recommendation engine uses a configuration file that is customized for the particular analysis being performed. For example, a first configuration file (referred to herein as a profile matching configuration file) may exist for use in identifying user characteristics similar to a sponsored content profile, whereas a second configuration file—specifying different characteristics from different recommendation entities to be compared, and a different algorithm for computing the matching scores—may be specified for determining the sponsored content that is most likely to be of interest to a particular user. As such, by configuring the characteristic extraction engine to extract relevant data from certain recommendation entities, and customizing the analysis performed by the matching engine with an appropriate configuration file, a wide variety of recommendation operations can be achieved with the general recommendation engine.

Figure 8:
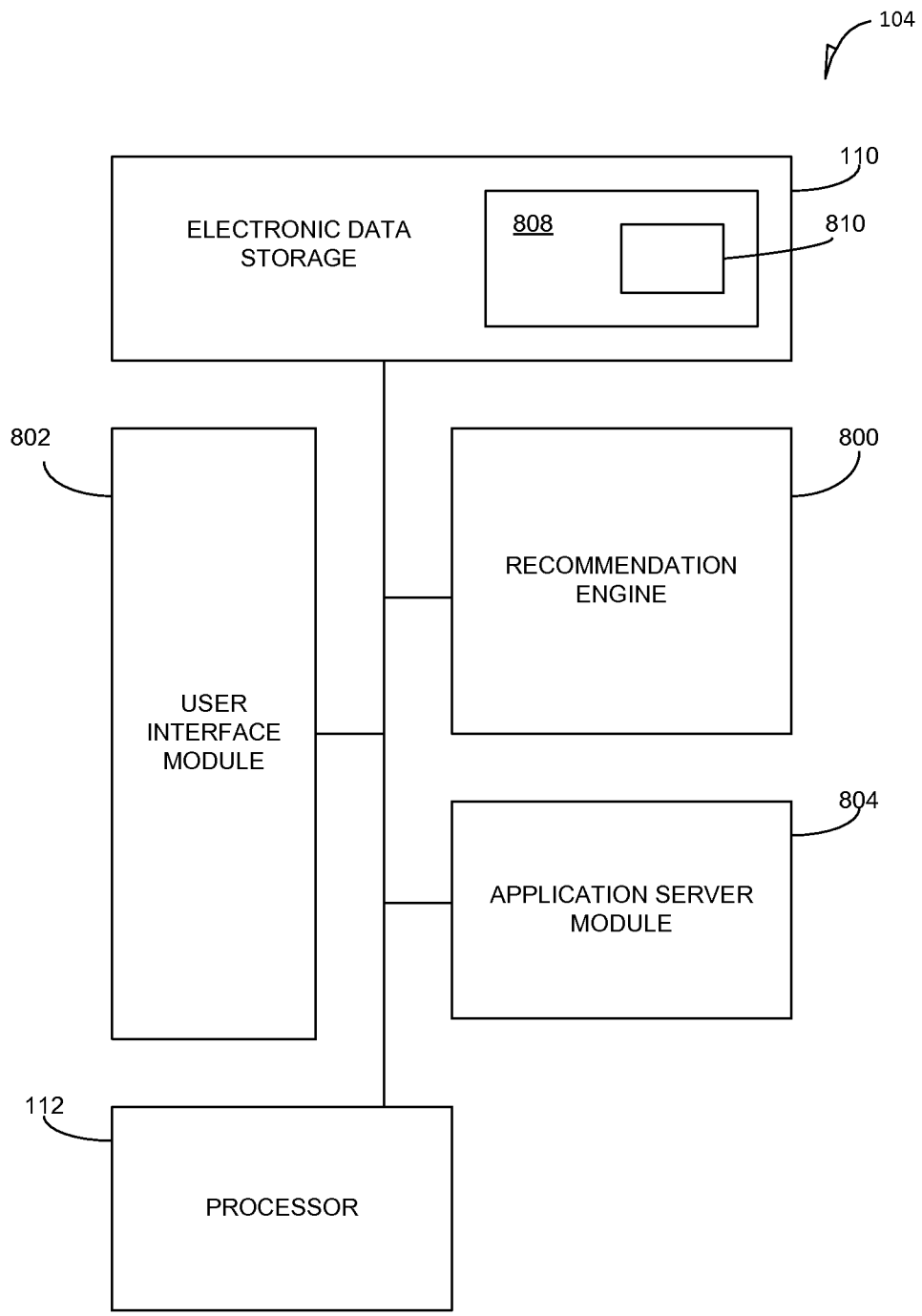
FIG. 8 is a block diagram illustrating various components of a social networking server with a recommendation engine.

FIG. 8 is a block diagram illustrating various components of a social networking server 104 with a recommendation engine 800 for identifying similarities between different recommendation entity types, such as user characteristics and sponsored content profiles. It is noted that, in various examples, the recommendation engine 800 may be a part of the targeted sponsored content engine 114. Alternatively or additionally, the recommendation engine 800 may incorporate elements of the system 100 beyond the targeted sponsored content platform 114 as appropriate. In an example, the social networking server 104 is based on a three-tiered architecture, consisting of a front-end layer, application logic layer, and data layer. As is understood by skilled artisans in the relevant computer and Internet-related arts, each module or engine shown in FIG. 8 and throughout this description can represent a set of executable software instructions and the corresponding hardware (e.g., memory and processor) for executing the instructions. To avoid obscuring the subject matter with unnecessary detail, various functional modules and engines that are not germane to conveying an understanding of the inventive subject matter have been omitted from FIG. 8. However, a skilled artisan will readily recognize that various additional functional modules and engines may be used with a social networking server 104 such as that illustrated in FIG. 8, to facilitate additional functionality that is not specifically described herein. Furthermore, the various functional modules and engines depicted in FIG. 8 may reside on a single server computer, or may be distributed across several server computers in various arrangements.

The front end of the social network server 104 consists of a user interface module (e.g., a web server) 802, which receives requests from various client computing devices, and communicates appropriate responses to the requesting client devices. For example, the user interface module(s) 802 may receive requests in the form of Hypertext Transport Protocol (HTTP) requests, or other web-based, application programming interface (API) requests. The application logic layer includes various application server modules 804, which, in conjunction with the user interface module(s) 200, generates various user interfaces (e.g., web pages) with data retrieved from various data sources in the data layer. With some embodiments, individual application server modules 804 are used to implement the functionality associated with various services and features of the system 100. For instance, the ability to identify user characteristics similar to a sponsored content may be a service implemented in an independent application server module 804. Similarly, other applications or services that utilize the recommendation engine 800 may be embodied in their own application server modules 804.

The data layer can include several databases, such as a database 808 for storing recommendation data, such as user characteristics and sponsored content profiles, and can further include additional social network information, such as interest groups, companies, advertisements, events, news, discussions, text posts, short form posts, questions and answers, and so forth. In some examples, the recommendation entity data is processed in the background (e.g., offline) to generated pre-processed entity data, that can be used by the recommendation engine, in real-time, to make recommendations generally, and to identify user characteristics similar to a sponsored content profile. In an example, the recommendation engine 800 may retrieve and process user characteristic data 810, including a user profile, user behavior, and a user social graph, in the database 808 to identify user characteristics similar to a sponsored content profile. The database 808 can store application configuration data, including one or more configuration files for use with the recommendation engine 800.

In various examples, when a person initially registers to become a user of the system 100, the person can be prompted to provide some personal information, such as his or her name, age (such as by birth date), gender, interests, contact information, home town, address, the names of the user's spouse and/or family users, educational background (such as schools, majors, etc.), employment history, skills, professional organizations, and so on. This information can be stored, for example, in the database 808.

Once registered, a user may invite other user, or be invited by other users, to connect via the system 100. A "connection" may involve a bi-lateral agreement by the users, such that both users acknowledge the establishment of the connection. Similarly, with some embodiments, a user may elect to "follow" another user. In contrast to establishing a "connection", the concept of "following" another user typically is a unilateral operation, in some examples, does not require acknowledgement or approval by the user that is being followed. When one user follows another, the user who is following may receive automatic notifications about various activities undertaken by the user being followed.

The system 100 may provide a broad range of other applications and services that allow user the opportunity to share and receive information, often customized to the interests of the user. In some examples, the system 100 may include a photo sharing application that allows users to upload and share photos with other users. In some examples, users may be able to self-organize into groups, or interest groups, organized around a subject matter or topic of interest. With some embodiments, users may subscribe to or join groups affiliated with one or more companies. For instance, with some embodiments, users of the system 100 may indicate an affiliation with a company at which they are employed, such that news and events pertaining to the company are automatically communicated to the users. In some examples, users may be allowed to subscribe to receive information concerning companies other than the company with which they are employed. With many of these applications and services, one or more recommendation entities may be involved. For instance, in addition to identifying user characteristics that are similar to a sponsored content profile, the recommendation engine 800 may be configured and customized to identify groups, companies or photos that are likely to be of interest to a particular user.

Figure 9:
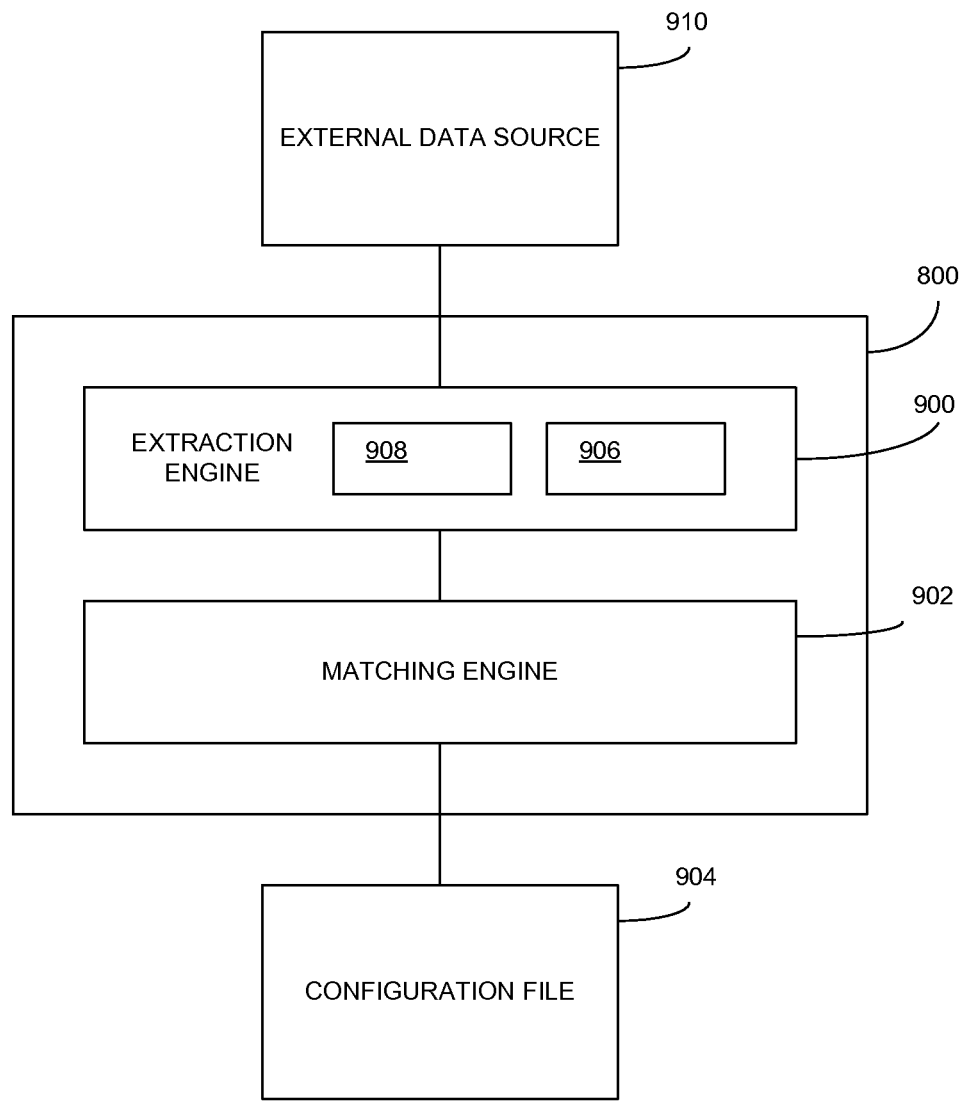
FIG. 9 is a block diagram showing some of the functional components or modules that comprise a recommendation engine.

FIG. 9 is a block diagram showing some of the functional components or modules that comprise a recommendation engine 800, in some examples, and illustrates the flow of data that occurs when performing various operations of a method for identifying and presenting user characteristics that are similar to a sponsored content profile. As illustrated, the recommendation engine 800 consists of two primary functional modules—a characteristic extraction engine 900 and a matching engine 902. The characteristic extraction engine 902 can be customized to extract various characteristics from various recommendation entities, and then operating the matching engine 902 under the direction of a particular configuration file 904 to perform a particular type of matching operation that is specific to the requesting application. Accordingly, depending upon the particular inputs to the recommendation engine 800 and the desired outputs, different configuration files 504 may be used to compare different characteristics of different recommendation entities. For instance, to identify user characteristics that are similar to a sponsored content profile, a particular configuration file 904 (referred to herein as a profile matching configuration file) may be used, while different configuration files 504 may be used to perform other tasks, such as identify sponsored content that a user may be interested in.

In the case of identifying user characteristics similar to a sponsored content profile, the profile matching configuration file 904 is used as an input to the matching engine 902 to specify the various user characteristics that the matching engine is to extract from the pre-processed user characteristic data 810 and to compare. In addition, the characteristic matching configuration file 904 can specify an algorithm for comparing characteristics and generating an overall matching score.

In various examples, each user's and the sponsored content's characteristic data 810 is provided as input to the characteristic extraction engine 900, processed by the characteristic extraction engine 900, and then output and stored as pre-processed user characteristic data 810. In some examples, the characteristic extraction engine 900 may extract only relevant characteristics from whatever recommendation entity is being processed by the characteristic extraction engine. So, for example, in the case of user characteristics, the characteristic extraction engine 900 may extract only the characteristics that are necessary for making the determination of whether a user characteristics is similar to a sponsored content profile. However, in some examples, all characteristics are extracted, while only certain characteristics are further processed or refined.

As illustrated, the characteristic extraction engine 900 includes a characteristic derivation module 906 and a data retrieval module 908. In some examples, the characteristic derivation module 906 derives certain characteristics (e.g., profile characteristics, behavior characteristics, and social graph characteristics) based on the data input to the characteristic extraction engine. For instance, in the case of user characteristics, the characteristic derivation module 906 may derive one or more characteristics from the information included in a user's characteristics. Similarly, the data retrieval module 908 may utilize information input to the characteristic extraction engine 900 to formulate a query that is communicated to an external data source 910. As such, the data retrieval module 908 of the characteristic extraction engine 900 can retrieve various characteristics from one or more external data sources, such that these retrieved characteristics can be used to determine the similarity of any two user characteristics.

In addition to deriving various characteristics, and retrieving various characteristics, the characteristic extraction engine 900 can include logic to normalize or standardize certain characteristics. For instance, in some examples, a user may be prompted to provide his or her job title. Because job titles can vary from one company to the next, and from one industry to the next, job titles may be normalized or standardized. For example, the simple job title, "analyst" may have very different meanings in different industries. By normalizing and/or standardizing the job titles and then writing the standardized and normalized job titles to each user's enhanced characteristics, the recommendation engine can make meaningful comparisons, and thereby provide relatively accurate results when presenting user characteristics similar to a sponsored content profile.

After the characteristic extraction engine 900 has generated the pre-processed user characteristic data 810, the matching engine 902 is able to process client requests to identify user characteristics similar to a sponsored content profile. In some examples, the client of the matching engine 902 may simply be a server-side application that is requesting the information from the matching engine 902. Accordingly, the requesting application may specify or determine the particular configuration file that is to be used by the matching engine 902 to perform the requested task and achieve the requested objective. When a request is received at the matching engine 902 to provide a list of user characteristics similar to a sponsored content profile, the matching engine 902 can use the profile matching configuration file 904 to determine the particular user characteristics that are to be retrieved from the various enhanced user characteristics. In addition, in various examples, the profile matching configuration file 904 can specify the exact comparisons that are to be performed, and how the overall matching score is to be calculated. Accordingly, the particular profile matching configuration file 904 can include instructions or directives for use by the matching engine 902 to perform the necessary characteristic comparisons, and to generate the aggregate sponsored content scores for each user characteristic, such that the aggregate sponsored content score for each user characteristic indicates the similarity of the user characteristics with respect to the sponsored content profile.

In some examples, the matching engine 902 can compare multiple individual characteristics such that each compared characteristic results in an aggregate sponsored content score (referred to herein as a sub-score, to reflect that the sub-score is a component of the overall aggregate sponsored content score). Once each sub-score is determined, the sub-scores are combined in some manner indicated by the profile matching configuration file 904. That is, the profile matching configuration file 904 will dictate how the matching engine 902 is to weight and combine the individual similarity sub-scores to derive the overall aggregate sponsored content score for each user characteristic.

Figure 10:
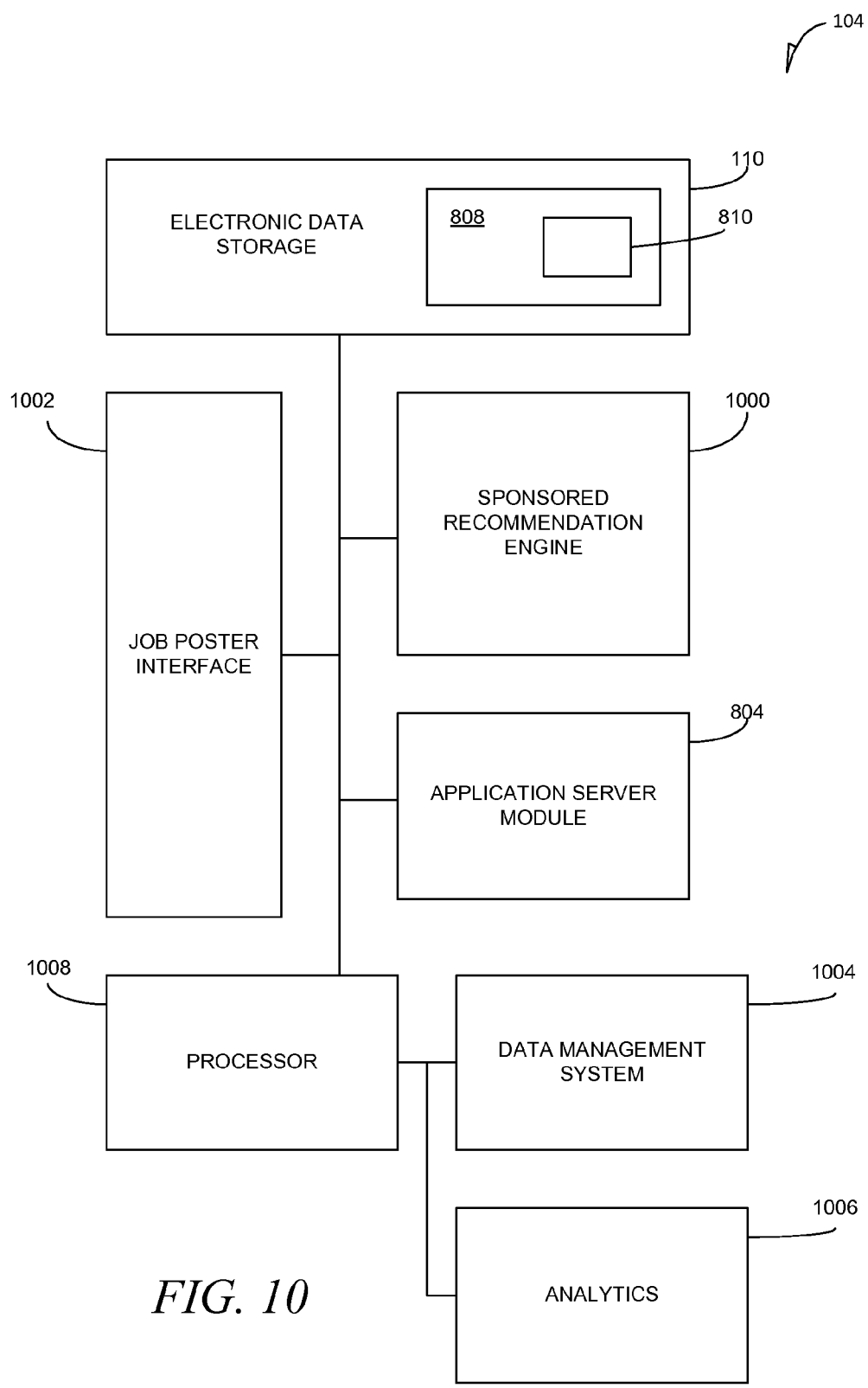
FIG. 10 is a detailed block diagram of a social network server.

FIG. 10 is a detailed example of the social network server 104. The social network server 104 includes a sponsored recommendation engine 1000. The sponsored recommendation engine 1000 can incorporate the recommendation engine 800 or can be an adapted, separate form of the recommendation engine 800. In an example, the sponsored recommendation engine 1000 is a component of the targeted sponsored content platform 114. In various examples, the sponsored recommendation engine 1000 includes characteristic comparison between user characteristics and sponsored content profiles, and further factors a sponsored content bid associated with the sponsored content profile. A sponsored content bid can correspond to a cost incurred by the sponsored content-posting entity to present the sponsored content posing to relevant users of the social network.

The server 104 can include a sponsored content poster interface 1002, such as with a user interface coupled to the server 104 or via the network interface 106. The user interface can include a conventional keyboard and display configuration well known in the art. The sponsored content poster interface 1002 provides an interface for the posting of sponsored contents, including a corresponding sponsored content profile, on the social network and an ability to enter sponsored content bids for posted sponsored contents. Such interaction by the sponsored content poster can cumulatively be referred to as a "campaign."

The sponsored content poster interface 1002 is coupled to a data management system 1004. The data management system 1004 can incorporate data management technologies well known in the art or can incorporate proprietary data management structures. In an example, the data management system 1004 incorporates SAS or Statistical Analysis System data management systems, to promote business analysis, statistical analysis, data storage and recover, and the like for sponsored content information. The data management system 1004 can include the capacity for social network administrators to utilize the data generated by the data management system 1004, such as by inputting tasks into the data management system.

The sponsored content poster interface 1002 and the data management system 1004 can both be coupled to the database 808. The sponsored content poster interface 1002 can transmit sponsored content data, such as sponsored content profiles and sponsored content bids, to the database 808 for storage without respect to data management activities. The data management system 1004 can store sponsored content data in the database 808 upon the sponsored content data having been acted upon for data management analysis.

The network interface 106 can provide the input of user data, such as user characteristics, into the social network. The user characteristics can be stored in the database 808 or can be directly transmitted to the sponsored recommendation engine 1000 for cross reference against the sponsored content profiles stored in the database 808. Sponsored contents identified by the sponsored recommendation engine 1000 can be transmitted via the network interface 106 to the user device 102 for presentation to the user.

A sponsored content analytics system 1006 can track the occurrence of sponsored contents that have been presented to or selected by a user. Bids by sponsored content posting entities can be based on a fixed number of occurrences that a sponsored content is presented to or selected by a user. In an illustrative example, a campaign may include a limit of one thousand (1,000) user selections for two (2) dollars per user selection. The sponsored content analytics system 1006 can track how many times sponsored content has been presented, how many times sponsored content has been selected or "clicked" on by a user, bill a sponsored content presenting entity accordingly, and adjust the remaining number of times the sponsored content has left to be presented or selected accordingly.

Various campaigns can specify various limitations or lack thereof. A campaign can include an absolute maximum of clicks that will be sponsored or no limit. A campaign may specify a campaign time limit of hours, days, or longer, or no time limit. The sponsored content analytics system 1006 can operate campaigns as auctions, such as by adjusting bids for a campaign within a range of bids based on the number of user selections the sponsored content has received; many selections may result in a lowered bid while few selections may result in a higher bid. A campaign may specify a campaign limit of monetary expenditure.

The sponsored content analytics system 1006 can further monitor which sponsored content is posted to users to seek to prevent sponsored content postings from being duplicated to a single user, as well as record analytical information related to the number of times, for instance, that a presented sponsored content has been clicked on by a user and the user characteristics of users who have clicked on sponsored content presentations. In various embodiments, the sponsored content analytics system 1006 can present the same sponsored content to the same user a predetermined number of times or until the user clicks on the sponsored content to learn more. The sponsored content analytics system 1006 can further terminate sponsored content bids that, for instance, meet a termination date or are being presented to users unsatisfactorily frequently or unsuccessfully. Additionally, the sponsored content analytics system 1006 may be utilized to renew or extend sponsored content bids, such as at the direction of the sponsored content presenting entity or the social network administrator.

In various examples, a recommendation entity for sponsored content can associate a monetary sponsored content bid with sponsored content. In such an example, the recommendation engine 800 can incorporate the relative size of a sponsored content bid in the calculation relating to the presentation of particular sponsored content to a particular user. Such monetary sponsored content bids can be in one or more currencies. The currencies may be normalized by up-to-date currency exchange rates for the purposes of determining the relative value of the bid.

In various alternative embodiments, the sponsored content bid can be non-monetary or can incorporate non-monetary elements. Such non-monetary elements can be promotional credits offered to a sponsored content posting entity by an administrator of the social network, can be services-in-kind with a supplier to the social network, and so forth. Such non-monetary elements can be assigned an equivalent monetary value for the purposes of calculating the relevance of particular sponsored content to a particular user.

In various examples, the database 808 incorporates multiple sponsored content profiles, each of the sponsored content profiles individually corresponding to one sponsored content item for which an entity that has corresponding sponsored content on offer. The sponsored recommendation engine 1000 is configured to determine an aggregate sponsored content score for at least some of the sponsored content profiles in the database 808 by incorporating a relevance of the sponsored content profiles to user characteristics using the recommendation engine 800 and a potential sponsored content bid corresponding to each sponsored content profile. Sponsored content profiles that do not incorporate a sponsored content bid may either not have their relevance score modified, or may be treated by the system 100 as a separate type of sponsored content profile in comparison with sponsored content profiles that have corresponding sponsored content bids.

In various examples, when a user accesses the social network, the sponsored recommendation engine 1000 cross references the user's characteristics against some or all of the sponsored content profiles in the database 808. The recommendation engine 800 can generate a relevance for each of the cross referenced characteristics. The sponsored recommendation engine 1000 can utilize a processor 1008 (in various examples, the processor 1008 is the processor 112 of the system 100) can manipulate the relevance for the sponsored content profile by a corresponding sponsored content bid. In an example, the relevance for a sponsored content profile is multiplied by the sponsored content bid corresponding to the sponsored content profile.

In an illustrative example, if the recommendation engine 800 arrives at a relevance of 0.8 for user characteristics in comparison with a first sponsored content profile, for instance because eighty (80) percent of the characteristics of the user and the first sponsored content profiles match, and the first sponsored content profile has a bid of two (2) dollars, the aggregate sponsored content score for the first sponsored content is 1.6. If the recommendation engine 800 arrives at a relevance of 0.4 for user characteristics in comparison with a second sponsored content profile, and the second sponsored content profile has a bid of five (5) dollars, the aggregate sponsored content score for the second sponsored content is 2.0. The social network may then display information related to the second sponsored content ahead of information related to the first sponsored content on the user device 102 corresponding to the user.

In various examples, the relevance of a job profile to a user may also factor in previous success that the job posing has had with other users. If a large percentage of users who are presented with a job posing based on the job profile select the job posing for more information, then the job posting may be deemed more relevant. A so-called "click-through rate" that exceeds a threshold may result in the relevance of the job posing being increased, while a click-through rate less than a threshold may result in the relevance of the job posting being reduced.

Relatedly, the characteristics of other users of the social network who do select a job posting for more information can also be incorporated into determining the relevance for a particular user. Characteristics of users who have selected a particular job posting in the past can be compared against user characteristics of a prospective user. To the extent that user characteristics of a prospective user are or are not related to the user characteristics of users who have selected a job posting in the past, the relevance of the job posting may similarly be increased or decreased for a prospective user. As such, the server 104 may store characteristics of users who have selected the job posting in the past and may develop composite user characteristics. The degree to which the characteristics of a prospective user match the composite characteristics may weight the results of the recommendation engine more heavily for a given prospective user.

In various examples, the sponsored recommendation engine 1000 does not present a sponsored content with corresponding sponsored content bid unless the relevance of the sponsored content profile to the user characteristics is greater than a minimum threshold. In such examples, it may be undesirable to display sponsored content that is unsuitable to a particular user to that user regardless of how much the sponsored content posting entity has bid. In various examples, the minimum threshold for sponsored content is approximately 0.85 and the minimum threshold for unsponsored content is 0.4. Thus, if the relevance of a third sponsored content profile to a user profile is 0.7, the sponsored content would not be presented to the user regardless of the size of the corresponding sponsored content bid, while unsponsored content with that relevance may be presented to the user.

In various examples, sponsored content with sponsored content bids (i.e., "sponsored content") and that have the highest aggregate sponsored content score are always presented to the user more prominently than sponsored content that does not have a corresponding sponsored content bid (i.e., "organic content"). In an example, only sponsored content is presented to the user. In an example, the system 100 may present the user a predetermined number of sponsored contents with the sponsored contents having the highest aggregate sponsored content scores presented to the user in descending order. If there are not sufficient sponsored contents to meet the sponsored contents requirement then the unfulfilled sponsored contents quota may simply be unmet. Upon the presentation of the predetermined number of sponsored contents, organic content may then be presented to the user, such as according to the organic content determined relevance to the user.

In an alternative example, the organic content may be assigned the same aggregate sponsored content score as their relevance score and all sponsored and organic content presented to the user based on the comparative sponsored content scores. In such an example, if an organic content has an aggregate sponsored content score of 1.0, while the highest aggregate sponsored content score for a sponsored content is 0.9, the organic content may be presented to the user ahead of the sponsored content.

Acquiring Sponsored and Organic Content

In various examples, the system 100 can obtain a combination of recommended sponsored and organic content for display on a user device 102. As discussed above, the unified social content platform 110 can incorporate or can access or call the targeted sponsored content platform 114. In various examples, a recommendation engine 800 can receive output from one or more databases 218. In examples in which the data in various databases 218 is not format-compatible across the databases 218, the unified social content platform 110 can translate the various data elements into a format, such as a single common format, that can be utilized by the recommendation engine 800 to obtain recommendations.

In an example, the recommendation engine 800 produces a list of recommended content for each individual database 218 from which recommended content is to be obtained. In an illustrative example, individual databases 218 include a job posting database, a status update database, an articles database configured to store content such as published informative or entertainment articles and other multimedia content, a user characteristics database, and so forth. The recommendation engine 800 can separately assess each individual database 218 and obtain recommended content from each database 218. In an example, the recommendation engine 800 obtains a predetermined number of recommended results from each database 218.

Figure 11:
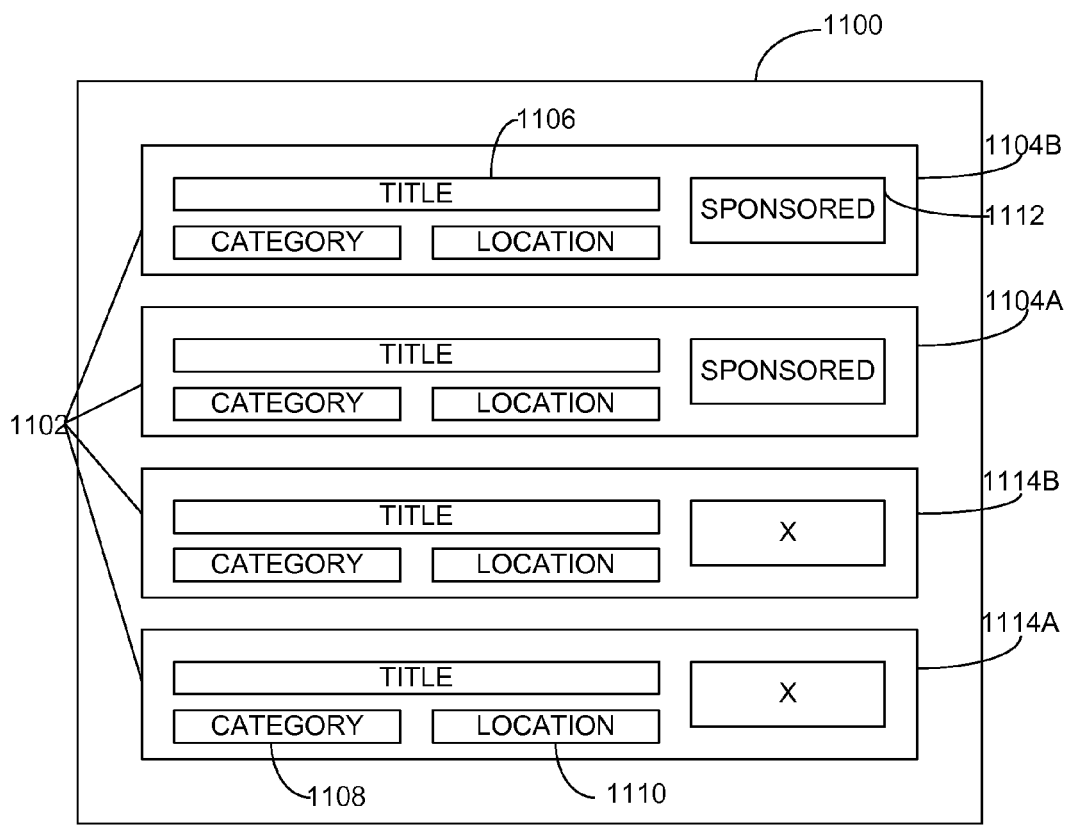
FIG. 11 is a depiction of a user interface screen.

FIG. 11 is a depiction of a user interface screen 1100 that can be displayed by the social network on the user device 102 corresponding to a user. In an example, the user interface screen 1100 is a sub-portion of a larger user interface screen displaying additional information related to the social network. Upon the sponsored recommendation engine 1000 having identified sponsored and organic content to present to a user, the social network server 104 can transmit the sponsored content to the user device 102, such as along with other social network information that is displayed on a user interface, such as a display screen, of the user device 102.

In the illustrated example, the user interface screen 1100 includes a news feed 1102 of sponsored and organic content. In various examples, the news feed 1102 is an ordered list based on various criteria described herein. If the sponsored recommendation engine 1000 did not identify any sponsored content to present to the user, the user interface screen 1100 may only present organic content. Depending on the aggregate sponsored content scores and the criteria for displaying the news feed 1102, in certain examples only sponsored content is presented on the news feed 1102.

In an example noted above, sponsored content items 1104A, 1104B are displayed at the top of the list, i.e., most prominently on the news feed 1102. In the above example, the sponsored content item 1104B corresponds to the second sponsored content profile that received an aggregate sponsored content score of 2.0 and is displayed most prominently at the top of the news feed 1102, while sponsored content item 1104a corresponds to the first sponsored content profile that received an aggregate sponsored content score of 1.6 and is displayed below and less prominently on the news feed 1102 than the first sponsored content item 1104B. In the illustrated example, the sponsored content items 1104A, 1104B include a sponsored content title 1106, a sponsored content category 1108, a sponsored content location 1110, are marked "sponsored" in the label section 1112.

In the illustrated example, organic content items 1114A, 1114B are displayed less prominently than the sponsored content items 1104A, 1104B. In an illustrative example, the organic content item 1114A corresponds to a relevance score of 0.9 and is displayed above of and more prominently than the organic content item 1114B, which has a relevance score of 0.7. The organic content items include the content title 1106, the content category 1108, the content location 1110, and the label section 1112. In various examples, organic content items 1114A, 1114B do not incorporate a label section 1112 or includes a label section 1112 with an indication that the content is not sponsored.

As noted above, various examples permit content items 1104A, 1104B and 1114A, 1114B to be displayed in various arrangements depending on the requirements of the social network. Thus, as noted above, the organic content may have their relevance scores converted into aggregate sponsored content scores and then all of the content items 1104A, 1104B and 1114A, 1114B positioned in the news feed 1102 according to their aggregate sponsored content scores. In this way, organic content 1114A, 1114B may be presented more prominently than some sponsored content items 1104A, 1104B.

In various examples, the news feed 1102 may not include any sponsored content item 1104A,B, such as if no content has been sponsored or if no sponsored content exceeds the relevance threshold for the user. In various examples, the news feed 1102 may not include any organic content 1114A,B, such as if the social network has been programmed to first present all sponsored content item 1104A,B until space on the news feed 1102 has been exhausted and only then begin displaying organic content.

Figure 12:
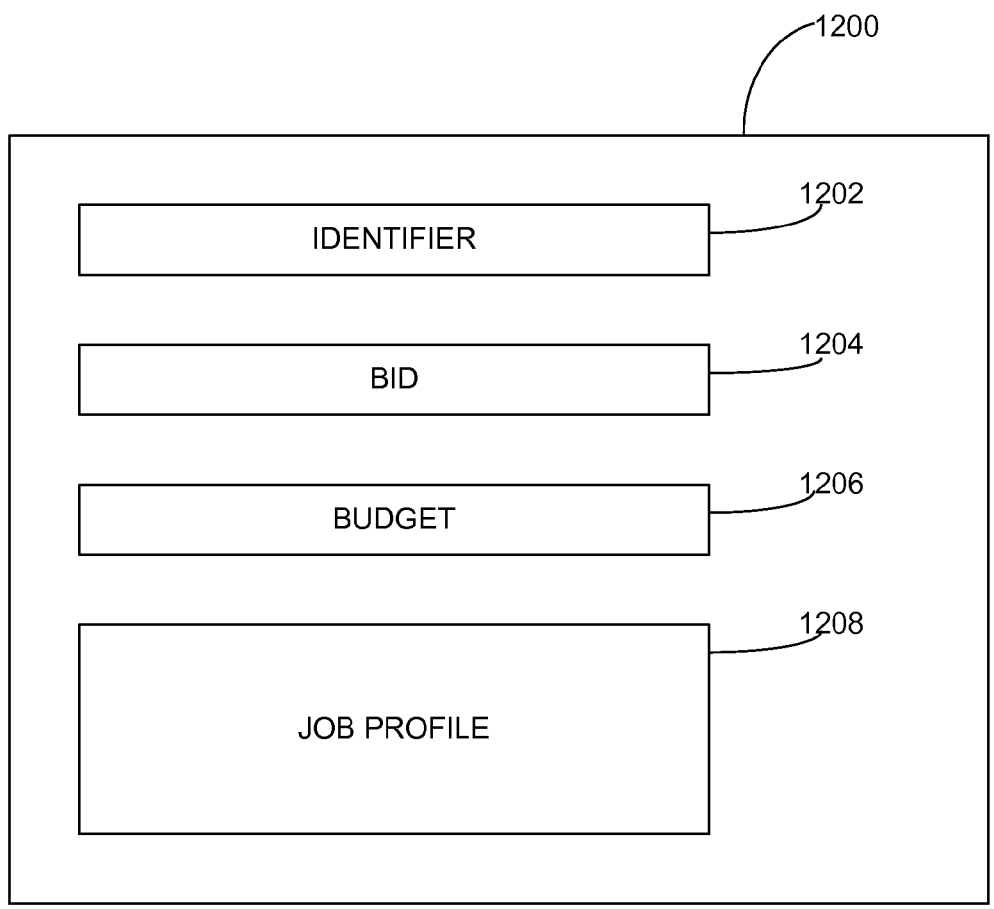
FIG. 12 is an illustration of an interface screen to create a campaign including a sponsored content bid for a sponsored content profile.

FIG. 12 is an illustration of an interface screen 1200 to create a campaign including a sponsored content bid for a sponsored content profile. The interface screen 1200 can be specifically adapted for use by customers, such as sponsored content posting entities, though the interface screen can be utilized by social network administrators or any other party for whom access to create or modify a campaign is granted. The interface screen 1200 can be displayed on a web browser or other program or application for displaying and interfacing with information known in the art. The interface screen 1200 can function as the sponsored content poster interface 1002.

The interface screen 1200 includes an identifier field 1202 to enter an identifier, such as a name, for the campaign. The identifier may be descriptive of the campaign and/or may uniquely identify the campaign. The interface screen 1200 further includes a bid field 1204 in which a bid price or range of bid prices for an auction format can be entered. A budget field 1206 can be utilized to limit either the number of sponsored content presentations or user selections will be paid for or a monetary limit for the campaign. Sponsored content profile field 1208 can be utilized to upload sponsored content profile characteristics or select a sponsored content profile that has already been entered into the system 100. In various examples, a single campaign can include multiple sponsored content profiles, with each user selection of a sponsored content profile counting against the limitations for the campaign as a whole.

The interface screen 1200 can be utilized to modify existing campaigns. Existing campaigns can be lengthened or shortened, have budgets and/or bids increased or decreased, and have sponsored content profiles added or removed from the campaign. Under certain business conditions, a sponsored content poster may be prevented from adjusting a campaign once a campaign has begun, in which case the interface screen 1200 may reflect an inability to change campaign parameters. In various examples, an administrator of the social network may always be given access to modify a campaign.

Figure 13:
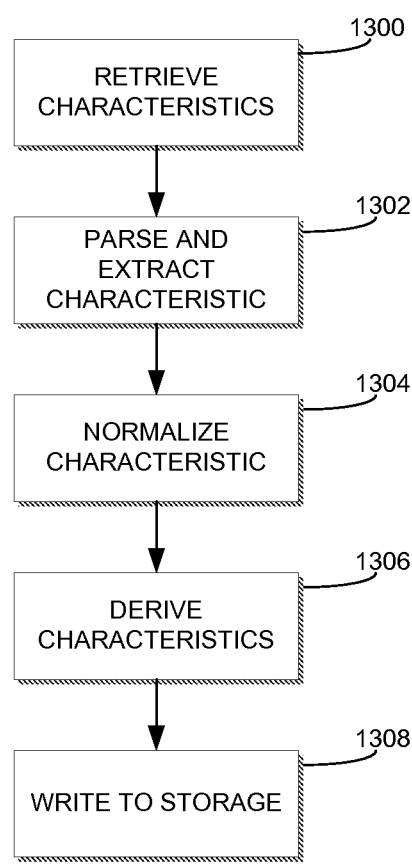
FIG. 13 is a flow diagram illustrating an example of operations involved in pre-processing user characteristics with a characteristic extraction engine to generate enhanced characteristics.

FIG. 13 is a flow diagram illustrating an example of the method operations involved in a method of pre-processing user characteristics with a characteristic extraction engine to generate enhanced characteristics for use by a matching engine. In some examples, some of the method operations illustrated in FIG. 13 may be performed offline by means of a batch process that is performed periodically (e.g., two times a day, daily, weekly, and so forth), while in other examples, the method operations may be performed online and in real-time as requests for similar user characteristics and sponsored content profiles are being received and processed.

At 1300, the relevant characteristics for a user or sponsored content profile are retrieved. In some examples, the characteristic extraction engine is configured to extract only certain characteristics from each user's information. Accordingly, the characteristic extraction engine may simply retrieve from a database the relevant data corresponding to the relevant characteristics. In some examples, the retrieval may be performing a database look-up or fetch of the relevant data.

At 1302, as some characteristics may be free-form text (i.e., unstructured data), such as a description of a user's interest, skills, hobbies, career objectives, and so forth, some of the relevant characteristics that have been retrieved are parsed and extracted from their raw data format.

At 1304, one or more processes may be performed to either normalize or standardize one or more characteristics. For instance, a user's job title may be standardized so that it can be more easily compared with others. Similarly, the name of a company that employees a user may be normalized, for example, to drop or add "Inc." or "Corporation" and so forth.

At 1306, the characteristic extraction engine 900 may derive one or more characteristics from raw data included in a user's characteristics or sponsored content's profile. For example, in some examples, one or more enhanced characteristics may be characteristics that are derived from the raw data included in a user's characteristics. If, for example, a user's characteristics indicates the year that he or she graduated from college, an enhanced characteristic that can be derived from this raw data may include the number of years of work experience after college. In addition, some characteristics may include data received from a data source external to the system 100. Accordingly, data from a user's characteristics (e.g., a name, or other identifying data) may be used to query an external data source for additional information about the user.

At 1308, the relevant characteristics, including characteristics such as extracted characteristics, derived characteristics, normalized or standardized characteristics, or retrieved characteristics are written to storage as pre-processed, enhanced user characteristics.

Figure 14:
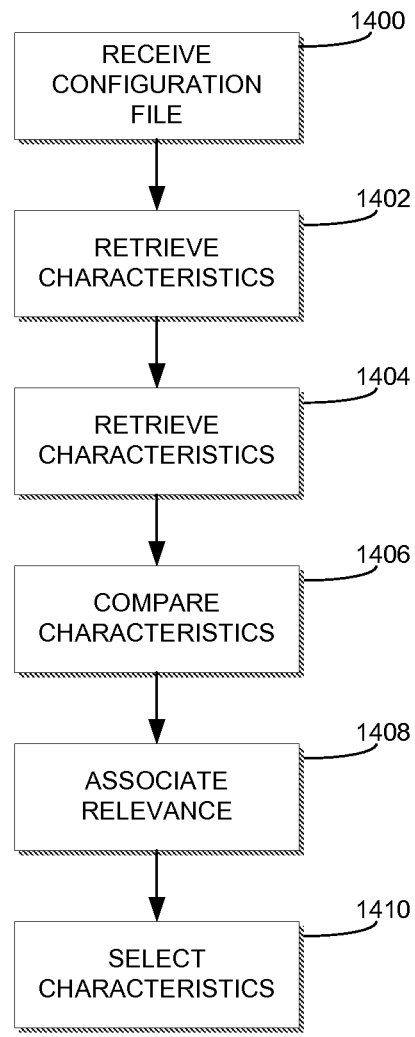
FIG. 14 is a flow diagram illustrating an example of operations involved in generating a relevance between a user characteristics and a sponsored content profile with a matching engine.

FIG. 14 is a flow diagram illustrating an example of the method operations involved in a method of generating a relevance between a user characteristics and a sponsored content profile with a matching engine 902.

At 1400, the recommendation engine 800 receives, retrieves, or otherwise reads or processes a profile matching configuration file. The profile matching configuration file, which may be a document formatted in Extensible Mark-up Language (XML) or in some other format, specifies the particular characteristics (or data elements) that are to be extracted or retrieved from a particular recommendation entity, such as an enhanced user characteristic. For example, in assessing the relevance of user characteristics to a sponsored content profile, the names of the person and the sponsored content may not play a role in determining the similarity of the characteristics. As such, the profile matching configuration file may not include user's names as a characteristic to be extracted and compared. However, technical skills or professional organizations may be relevant to the analysis, and as such, these characteristics may be specified in the profile matching configuration file, such that the data representing these characteristics are ultimately retrieved and analyzed by the matching engine 902.

As discussed below, the profile matching configuration file specifies the particular characteristics to be retrieved as well as the particular matching algorithms to be used for each of the retrieved characteristics. For example, the profile matching configuration file indicates an algorithm or comparison operations that are to be performed for the various characteristics specified in the profile matching configuration file, and how the various similarity sub-scores, resulting from the comparison of individual characteristics, are to be combined to generate an overall relevance. In some instances, the profile matching configuration file may indicate that a particular comparison is to be performed for a particular characteristic that results in a match only when there is an exact match. In other instances, a partial match may be indicated, and so forth. In some instances, the comparison may involve determining whether a particular user characteristic is within a particular distance of the same sponsored content profile characteristic and so forth. As such, the matching profile may indicate not only the type of matching operation to be performed between a particular pair of characteristics, but also the weight that should be applied to any resulting sub-score generated as a result of a match occurring between two characteristics. In some examples, the weight applied to any particular sub-score may be dependent upon the extent to which two characteristics match, as specified by a matching algorithm or rule in the profile matching configuration file.

At 1402, the relevant characteristics for one of the user characteristics and the sponsored content profile are retrieved. In some instances, the sponsored content profile may be selected by a user, while in other instances, an application or process selects a particular sponsored content profile. In any case, the relevant sponsored content profile characteristics for the selected sponsored content profile are those sponsored content profile characteristics specified in the profile matching configuration file obtained at 1400. In some examples, each user and sponsored content profile may have an identifier (e.g., such as a user or sponsored content identifier, or, user or sponsored content profile identifier). Accordingly, a request to identify sponsored content profiles similar to user characteristics may include an identifier identifying the sponsored content profile. With this, the matching engine 902 can retrieve the necessary characteristics from the pre-processed, enhanced user or sponsored content profile for the particular user or sponsored content identified by the user or sponsored content identifier, as the case may be.

At 1404, the matching engine retrieves the same set of characteristics for the other of the user characteristics or sponsored content profile not retrieved at 1402. In some examples, the particular user or sponsored content profiles that are compared may be selected based on some required matching criteria, either by default, or as specified by an application, process or user who has initiated the request. For instance, the matching analysis may be limited to only those users or sponsored content that share a particular characteristic in common with the profile selected in 1402, such as having the same job title, or experience requirement. In other instances, the entire set of user characteristics or sponsored content profiles may be considered.

At 1406, the matching engine 902 compares the various characteristics and calculates a relevance for the user characteristics and the sponsored content profile in accordance with the instructions or directives set forth in the profile matching configuration file. For instance, the profile matching configuration file indicates what comparison operation is to be performed for a pair of characteristics, and how the various similarity sub-scores are to be combined to derive the overall aggregate sponsored content score.

At 1408, the relevance is associated with the user characteristics. The process of operation 1406 may be repeated for additional sponsored content profiles, until all of a particular set of sponsored content profiles have been assigned relevance scores.

At 1410, once all the sponsored content profiles have a relevance score, indicating a level of similarity to the user characteristics, a certain number of the sponsored content profiles with the highest aggregate sponsored content scores are selected for use with the sponsored recommendation engine 1400. In some examples, the number of sponsored content profiles that are selected and provided for use with a requesting application may be determined using some default or predetermined number. Alternatively, in some examples, the number of user characteristics that are selected and provided to a particular requesting application may be configurable so that a certain number of the user characteristics with the highest relevance scores are provided. For example, in some examples, the profile matching configuration file specifies the number of user characteristics that are to be returned to the requesting application. The number of user characteristics may be specified explicitly (e.g., ten, thirty, one-hundred), or via a rule, such as, the top "X" number of user characteristic sets, or all user characteristic sets with a matching score exceeding "X", or some combination.

Figure 15:
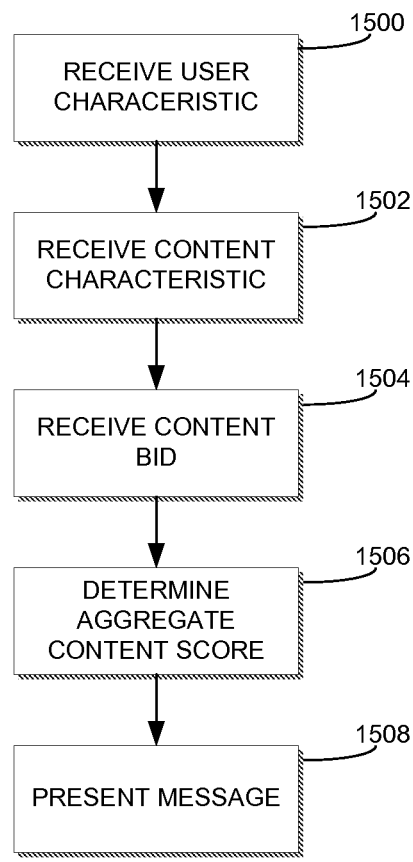
FIG. 15 is a flowchart for presenting sponsored content to a user based on an aggregate sponsored content score.

FIG. 15 is a flowchart for presenting sponsored content to a user based on an aggregate sponsored content score. The flowchart is discussed herein with respect to the system 100, but can be implemented on any suitable system.

At 1500, a user characteristic is received by the processor 112. In various examples, multiple user characteristics are received by the processor 112. The user characteristic can be received via network interface 106, can be obtained from the electronic data storage 110 of the system 100, or can be received as input from a direct physical connection to the system 100, among other possible input methodologies known in the art.

At 1502, a sponsored content characteristic of a sponsored content profile of a sponsored content is received by the processor 112. In various examples, multiple sponsored content characteristics of the sponsored content profile are received by the processor 112. The sponsored content characteristic can be received via the sponsored content poster interface 1202, such as via the network interface 106, from the electronic data storage 110 of the system, or can be received as input from a direct physical connection to the system 100, among other possible input methodologies known in the art. In various examples, sponsored content characteristics from multiple sponsored content profiles can be received.

At 1504, a sponsored content bid is received from an entity related to the sponsored content, such as a sponsored content posting entity that posted the sponsored content to the social network. In various examples, the sponsored content bid can include a monetary bid for a number of times a message related to the sponsored content is posted on a user device 102, a number of times a user selects or "clicks" on the message, an amount of money the sponsored content posting entity is willing to pay for each time a sponsored content message is presented, selected, or otherwise interacted with, a total amount of money the sponsored content posting entity is willing to pay, a duration of time the bid is active, and so forth as disclosed herein. In various examples, multiple sponsored content bids from multiple pieces of sponsored content can be received. The number of sponsored content bids received, thereby denoting sponsored content, can be less than the total number of sponsored content items corresponding to the sponsored content profiles received at 1502, with the sponsored content items not corresponding to sponsored content bids being organic content.

At 1506, the processor 112 determines an aggregate sponsored content score for the user based on the relevance of the sponsored content characteristic to the user characteristic and the sponsored content bid. The relevance can be determined according to the methodology of FIG. 12 and as disclosed herein. Relevance can be determined as a percentage of matching ones of the user and sponsored content characteristics that comprise the user and sponsored content profiles, respectively. The aggregate sponsored content score can be arrived at by applying the bid to the relevance. In various examples, the relevance is multiplied by the bid to arrive at the aggregate sponsored content score. In various examples, an aggregate sponsored content score is obtained for each sponsored content item. In various examples, only a relevance score is obtained for organic content. In various examples, both sponsored and organic content obtain an aggregate sponsored content score.

At 1508, a message relating to the sponsored content is presented to the user based, at least in part, on the aggregate sponsored content score. In various examples, the message is presented as illustrated on the interface screen 800. In various embodiments, the message includes an internet web link to further information. As shown on the interface screen 800, presentation of the message related to the sponsored content can be organized on the interface screen 800 as an ordered list according to whether the sponsored content is sponsored content and which sponsored content has the largest aggregate sponsored content score. In various examples, multiple messages related to different sponsored content items are presented with respect to one another based on their respective aggregate sponsored content scores, such as by placing higher magnitude aggregate sponsored content scores relatively more prominently on the interface screen 800. In various examples, only sponsored content that has a relevance with a magnitude greater than a predetermined threshold are presented to the user.

Figure 16:
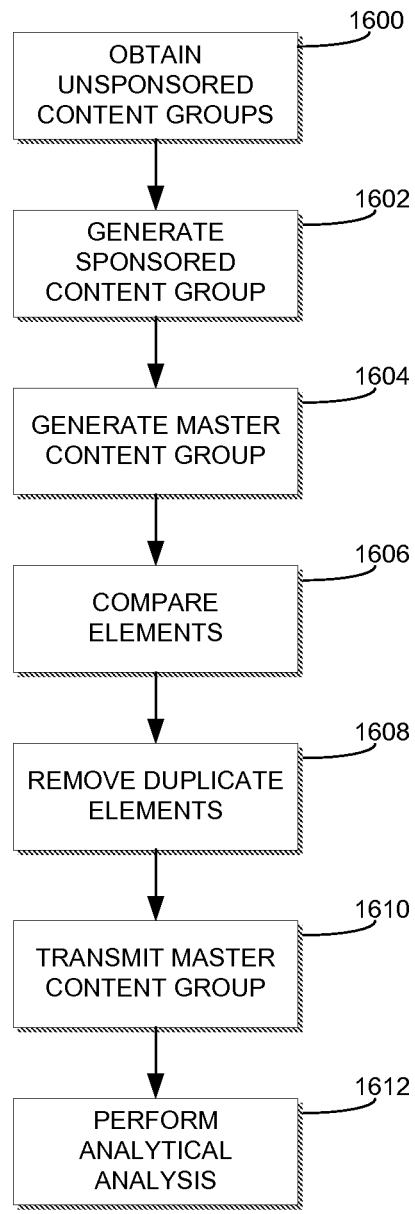
FIG. 16 is a flowchart for transmitting a master content group including both sponsored and unsponsored content.

FIG. 16 is a flowchart for transmitting a master content group including both sponsored and unsponsored content. The flowchart can utilize the social networking system 100 or any other suitable system or device.

In operation 1600, the unified social content platform 110 obtains an unsponsored or organic content group from each of a plurality of unsponsored content group sources, such as the databases 218. In various examples, each unsponsored content group includes at least one unsponsored or organic content element. In various examples, the unsponsored content groups are obtained based on a relevance of at least some unsponsored content elements of at least some unsponsored content groups to a characteristic of a user, such as is determined by the recommendation engine 800. In various examples, each unsponsored content group comprises not more than a predetermined maximum number of unsponsored content elements.

In operation 1602, the system 100 generates a sponsored content group. In various examples, the sponsored content group includes at least one sponsored content element and an associated bid. In various examples, the sponsored content group is generated by the targeted sponsored content platform 114, such as with the sponsored recommendation engine 1000, as implemented in or by the targeted sponsored content platform 114. In various examples, the sponsored content group is generated based on the relevance as determined by the sponsored recommendation engine 1000, the bid, and at least one of a maximum frequency at which individual ones of the sponsored content elements are to be displayed to users and a total available budget for each individual one of the sponsored content elements, such as can be entered via the interface 1002 and the interface screen 1200. More generally, the system can define a pacing for the campaign in which targeted content is delivered substantially evenly over a defined period of time, such as over a day, a week, or a total duration of the campaign, in several illustrative examples. In an example, the sponsored content group contains not more than a predetermined maximum number of sponsored content elements.

In various examples, with respect to at least one of 1600 and 1602, the user characteristic can be one of multiple of user characteristics. In such examples, the unsponsored content elements and the sponsored content elements each have at least one content characteristic. In such examples, the recommendation engines 800, 1000 can determine relevance of each of the unsponsored and sponsored content elements is based, at least in part, on a number of user characteristics related to the at least one content characteristic of each of the unsponsored and sponsored content elements.

In operation 1604, the targeted sponsored content platform 114 generates a master content group based on the unsponsored content groups and the sponsored content group. In various examples, the master content group is generated based on the relevance of the unsponsored content elements as determined by the recommendation engine 800 and a relevance of the sponsored content element to the characteristic of the user and the associated bid as determined by the sponsored recommendation engine 1000. The master content group can be the content that is displayed on the news feed 1102 of the user interface screen 1100.

In operation 1606, the system 100, and in an example the unified social content platform 110, compares the unsponsored content elements and the sponsored content elements of the master content group to identify duplicate content elements.

In operation 1608, the system, and in an example the unified social content platform 110, removes at least one duplicate content element from the master content group. In various examples, the duplicate content element is an unsponsored content element. In various alternative examples, the duplicate element is a sponsored content element. In various examples, whether a sponsored or unsponsored content element is removed based on being a duplicate is based on a user selection, such as a general rule to always remove either a sponsored content element or an unsponsored content element in the event of duplication.

In operation 1610, the system 100 transmits the master content group to a user device 102 associated with the user corresponding to the user characteristic.

In operation 1612, the system 100 performs an analytical analysis based on selection of a selectable link of a sponsored content element of the master content group by a user on the user device 102. In such examples, at least some of the unsponsored content elements and sponsored content elements include a selectable link to information relating to the at least some of the unsponsored content elements and sponsored content elements. In various examples, the analytical analysis is performed by the sponsored content analytics system 1006. In various examples, the analytical analysis is based on a rate at which users who are presented with the at least some unsponsored content elements and sponsored content elements select the selectable link.

Figure 17:
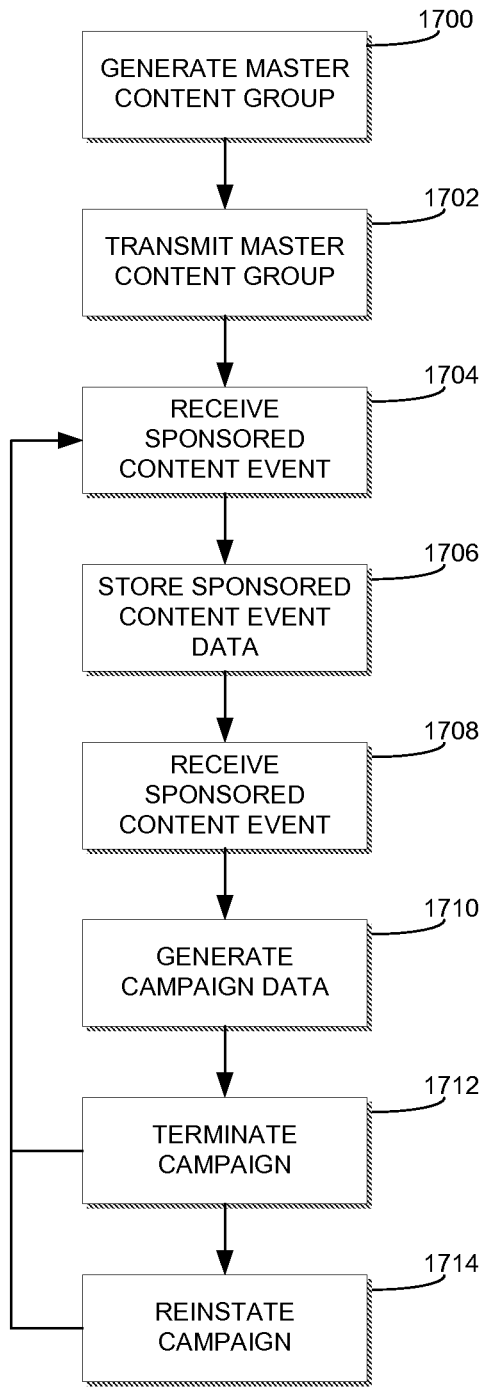
FIG. 17 is a flowchart for providing a sponsored content campaign across a plurality of servers, such as may be distributed across a plurality of data centers.

FIG. 17 is a flowchart for providing a sponsored content campaign across a plurality of servers, such as may be distributed across a plurality of data centers. While the flowchart will be described with respect to the system 100, it is to be understood that the flowchart may be implemented on any suitable system.

In operation 1700, the processor 112 for a server 104A generates a master content group for an individual user of the social network based on an unsponsored content group and a sponsored content group corresponding to the sponsored content campaign as provided by the targeted sponsored content module 114 of the server 104A.

In operation 1702, the transmitter 118 transmits the master content group for display on the news feed 1102 of the user interface screen 1100 of the user device 102 associated with the individual user.

In operation 1704, the server 104A receives sponsored content event data 306 from the user device 102 associated with the individual user, such as user interactions on the user interface screen 1100, such as clicks or selections, of sponsored content items 1104 of the sponsored content group.

In operation 1706, the sponsored content event data 306 as received by the server 104A are optionally stored in the database 116 along with sponsored content event data 306 that may be determined from the generation and transmission of the master content group, such as sponsored content items 1104 that are transmitted for display on the news feed 1102. As disclosed herein, the database 116 may be associated with the particular server 104A or may be separate from the particular server 104A.

In operation 1708, the targeted sponsored content platform 114 of the server 104A receives the sponsored content event data 306, variously from the server 104A itself, the database 116, and/or directly from the user devices 102 by way of the network 108, and/or directly from other servers 104B, 104C. In various examples, the sponsored content event data 306 from the database 116 and/or the servers 104B, 104C is received periodically and/or in batches. As a result, certain sponsored content event data 306 at the server 104A may be more current than other sponsored content event data 306.

The sponsored content event data 306 transmitted to the server 104A may be based on any of a variety of the metadata associated with the sponsored content event data 306. For instance, the server 104A may be configured to receive sponsored content event data 306 that corresponds to any sponsored content campaign and sponsored content entity that is operated by the server 104A. The server 104A may be configured to receive any other sponsored content event data 306 that may be useful in determining a sponsored content campaign operated by the system 100.

In operation 1710, the targeted sponsored content platform 114 generates campaign data of a sponsored content campaign based on the sponsored content event data 306 as generated by the master content groups presented to individual user devices 102 and as possessed by the targeted sponsored content platform 114 data on the server 104A. In an example, the targeted sponsored content platform 114 utilizes the sponsored content event data 306 and estimates sponsored content event data 306 that has likely been obtained by the other servers 104B, 104C since the most recently obtained sponsored content event data 306 from the corresponding server 104B, 104C.

In various examples, servers 104B, 104C may provide sponsored content event data 306 to the database 116 and/or to the server 104A at any of a variety of intervals or batch criteria, as disclosed herein. In an example, the servers 104B, 104C provide the sponsored content event data 306 at five (5) minute intervals, though it is to be understood that the intervals may be less (e.g., thirty (30) seconds or one (1) minute, etc.) or longer (e.g., one (1) hour or one (1) day, etc.), or may be based on a quantity trigger, such as when a buffer is filled or otherwise reaches a predetermined level. In absence of receiving the actual sponsored content event data 306 from each server 104B, 104C or the database 116, the targeted sponsored content engine 114 may estimate the sponsored content event data 306 that has been generated but not transmitted.

In the above example with five (5) minute data transmission intervals, the campaign consumption module 302 may calculate an estimated number of sponsored content event data 306 in a typical batch from a given server 104B for the subject sponsored content campaign. For instance, the campaign consumption module 302 may determine an average number of sponsored content events 302 in an immediately preceding number of intervals, such as three (3) intervals, five (5) intervals, ten (10) intervals, and the like, and apply the average as the estimated number of sponsored content event data 306 over the not-yet-received batch. The estimate may be prorated given the anticipated time until the receipt of the next batch; thus, if two (2) minutes have elapsed since receipt of the previous batch, the estimated sponsored content event data 306 may be reduced to forty (40) percent of the estimate for the pending batch. Relatedly, if a batch is not received as anticipated, the prorating may be greater than one hundred (100) percent; if six (6) minutes have passed since the preceding batch, the estimated sponsored content event data 306 may be one hundred twenty (120) percent of the average of the preceding batches.

A variety of alternative or additional modes for estimating the sponsored content event data 306 on the servers 104B, 104C may be utilized. The estimate may be based on an actual number of sponsored content event data 306 over the same time period in a preceding day or preceding days. The estimates may be based on a preceding time period rather than a preceding batch, such as one (1) hour, twenty-four (24) hours, and so forth. Additional modes of estimating the not-yet-received sponsored content event data 306 are contemplated.

In operation 1712, the campaign consumption module 302 compares the campaign data as generated in operation 1710 against one or more campaign termination criteria. Termination of a campaign may be asynchronous with the receipt of sponsored content event data 306, such as from the servers 104B, 104C. The campaign termination criteria may relate to terminating the corresponding sponsored content campaign altogether or suspending the sponsored content campaign temporarily. The campaign termination criteria may be based on campaign data directly related to the subject campaign itself or to campaign data related to the sponsoring entity of the campaign. Thus, a campaign may be terminated based on meeting a campaign termination criterion for the campaign or the entity, such as by exceeding a monetary budget for the campaign or entity or by meeting a desired number of sponsored content events.

The comparison of the campaign termination criterion may be applied to a suspended campaign to reinstate the campaign. For instance, where a campaign or entity has a daily maximum budget or desired number of sponsored content events, passage of the time limit may allow the suspension of the campaign to be lifted. In an example, if a campaign or entity has a daily maximum that was met, the turning of the relevant clock to midnight may result in the campaign consumption module 302 lifting the suspension on the campaign or campaigns of the entity.

In operation 1714, following receipt of a batch of sponsored content event data 306 that was subject to a previous estimate, the campaign consumption module 302 may optionally check the actual data 306 against the campaign termination criteria and rescind the termination of the campaign if the campaign was terminated based on an inaccurate estimate.

With respect to the flowchart of FIG. 17, is to be recognized and understood that, while the discussion relates to the server 104A, the operations may apply equally well to all of the servers, asynchronously and independently. Thus, each server 104 may function to provision the same campaign but not be reliant on precisely up-to-date sponsored content event data 306 from every other server 104 in order to terminate the associated campaign. In that way, servers 104 that may be widely dispersed in different data centers, may fall out of communication with one another, may have unreliable or slow communication channels, and other factors, while still being configured to provide the same sponsored content campaigns accurately.

Figure 18:
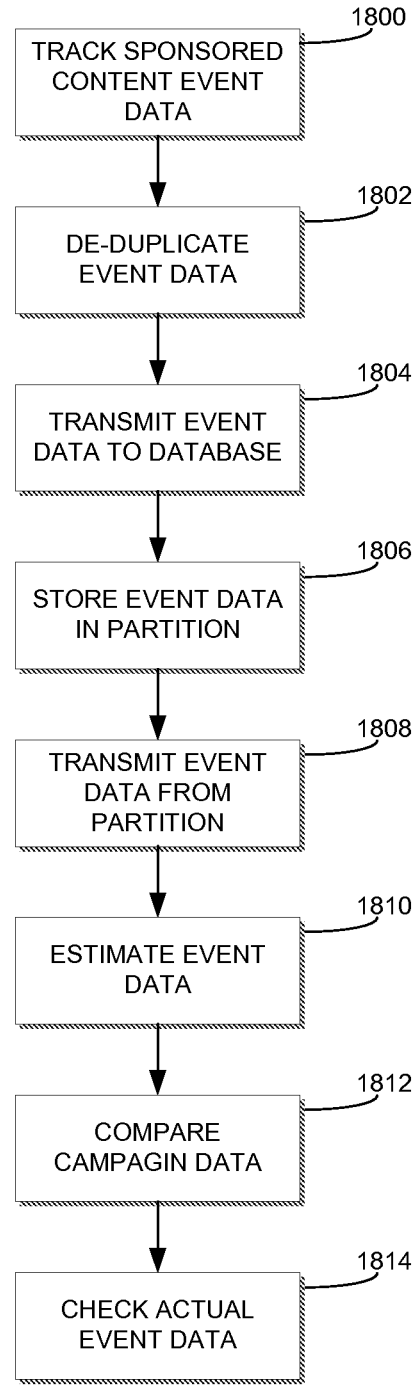
FIG. 18 is a flowchart for providing a sponsored content campaign utilizing a partition of a database.

FIG. 18 is a flowchart for providing a sponsored content campaign utilizing a partition of a database. While the flowchart will be described with respect to the system 100, it is to be understood that the flowchart may be implemented on any suitable system.

In operation 1800, the processors 112, such as the may implement the tracking modules 300, track sponsored content event data 306 received from a user device 102.

In operation 1802, a processor 112 de-duplicates sponsored content event data 306 as received, as disclosed herein.

In operation 1804, the transmitter 118 transmits the sponsored content event data 306 to the database 116. In various examples, the transmitter 118 transmits the sponsored content event data 306 in a batch based on a common destination partition 400, such as based on a common campaign identifier and/or a common entity identifier, as disclosed herein.

In operation 1806, the database 116 stores the sponsored content event data 306 in a partition 400. In various examples, each sponsored content event data 306 is stored in a partition 400 corresponding to at least one of the sponsored content campaign from which the sponsored content event data 306 derives and the partition 400 corresponding to the sponsoring entity corresponding to the sponsored content event data 306. In various examples, the database 116 stores the sponsored content event data 306 based on the campaign identifier and the entity identifier associated with the sponsored content event data 306. The database 116 optionally de-duplicates the sponsored content event data 306, as disclosed herein.

In operation 1808, the database 116 transmits at least some of the sponsored content event data 306 from a partition 400 to the server 104A.

In operation 1810, the campaign consumption 306 estimates sponsored content event data 306 not received from the database 116. In an example, the estimated sponsored content event data 306 is based on data that has likely been generated but not received from the partition 400 of the database 116. In various examples, the database 116 may provide the sponsored content event data 306 at five (5) minute intervals, though it is to be understood that the intervals may be less (e.g., thirty (30) seconds or one (1) minute, etc.) or longer (e.g., one (1) hour or one (1) day, etc.), or may be based on a quantity trigger, such as when a buffer is filled. In absence of receiving the actual sponsored content event data 306 from the database 116, the targeted sponsored content engine 114 may estimate the sponsored content event data 306 that has been generated but not transmitted.

In the above example with five (5) minute data transmission intervals, the campaign consumption module 302 may calculate an estimated number of sponsored content event data 306 in a typical batch from the partition 400 for the subject sponsored content campaign. For instance, the campaign consumption module 302 may determine an average number of sponsored content events 302 in an immediately preceding number of intervals, such as three (3) intervals, five (5) intervals, ten (10) intervals, and the like, and apply the average as the estimated number of sponsored content event data 306 over the not-yet-received batch. The estimate may be prorated given the anticipated time until the receipt of the next batch; thus, if two (2) minutes have elapsed since receipt of the previous batch, the estimated sponsored content event data 306 may be reduced to forty (40) percent of the estimate for the pending batch. Relatedly, if a batch is not received as anticipated, the prorating may be greater than one hundred (100) percent; if six (6) minutes have passed since the preceding batch, the estimated sponsored content event data 306 may be one hundred twenty (120) percent of the average of the preceding batches.

A variety of alternative or additional modes for estimating the sponsored content event data 306 may be utilized. The estimate may be based on an actual number of sponsored content event data 306 over the same time period in a preceding day or preceding days. The estimates may be based on a preceding time period rather than a preceding batch, such as one (1) hour, twenty-four (24) hours, and so forth. Additional modes of estimating the not-yet-received sponsored content event data 306 are contemplated.

In operation 1812, the campaign consumption module 302 compares the campaign data as generated in operation 1810 against one or more campaign termination criteria and terminates the sponsored content campaign. Termination of a campaign may be asynchronous with the receipt of sponsored content event data 306, such as from the database 116. The campaign termination criteria may relate to terminating the corresponding sponsored content campaign altogether or suspending the sponsored content campaign temporarily. The campaign termination criteria may be based on campaign data directly related to the subject campaign itself or to campaign data related to the sponsoring entity of the campaign. Thus, a campaign may be terminated based on meeting a campaign termination criterion for the campaign or the entity, such as by exceeding a monetary budget for the campaign or entity or by meeting a desired number of sponsored content events.

The comparison of the campaign termination criterion may be applied to a suspended campaign to reinstate the campaign. For instance, where a campaign or entity has a daily maximum budget or desired number of sponsored content events, passage of the time limit may allow the suspension of the campaign to be lifted. In an example, if a campaign or entity has a daily maximum that was met, the turning of the relevant clock to midnight may result in the campaign consumption module 302 lifting the suspension on the campaign or campaigns of the entity.

In operation 1814, following receipt of a batch of sponsored content event data 306 that was subject to a previous estimate, the campaign consumption module 302 may optionally check the actual data 306 against the campaign termination criteria and rescind the termination of the campaign if the campaign was terminated based on an inaccurate estimate.

With respect to the flowchart of FIG. 18, is to be recognized and understood that, while the discussion relates to the server 104A, the operations may apply equally well to all of the servers, asynchronously and independently. Thus, each server 104 may function to provision the same campaign but not be reliant on precisely up-to-date sponsored content event data 306 from every other server 104 in order to terminate the associated campaign. In that way, servers 104 that may be widely dispersed in different data centers, may fall out of communication with one another, may have unreliable or slow communication channels, and other factors, while still being configured to provide the same sponsored content campaigns accurately.

Figure 19:
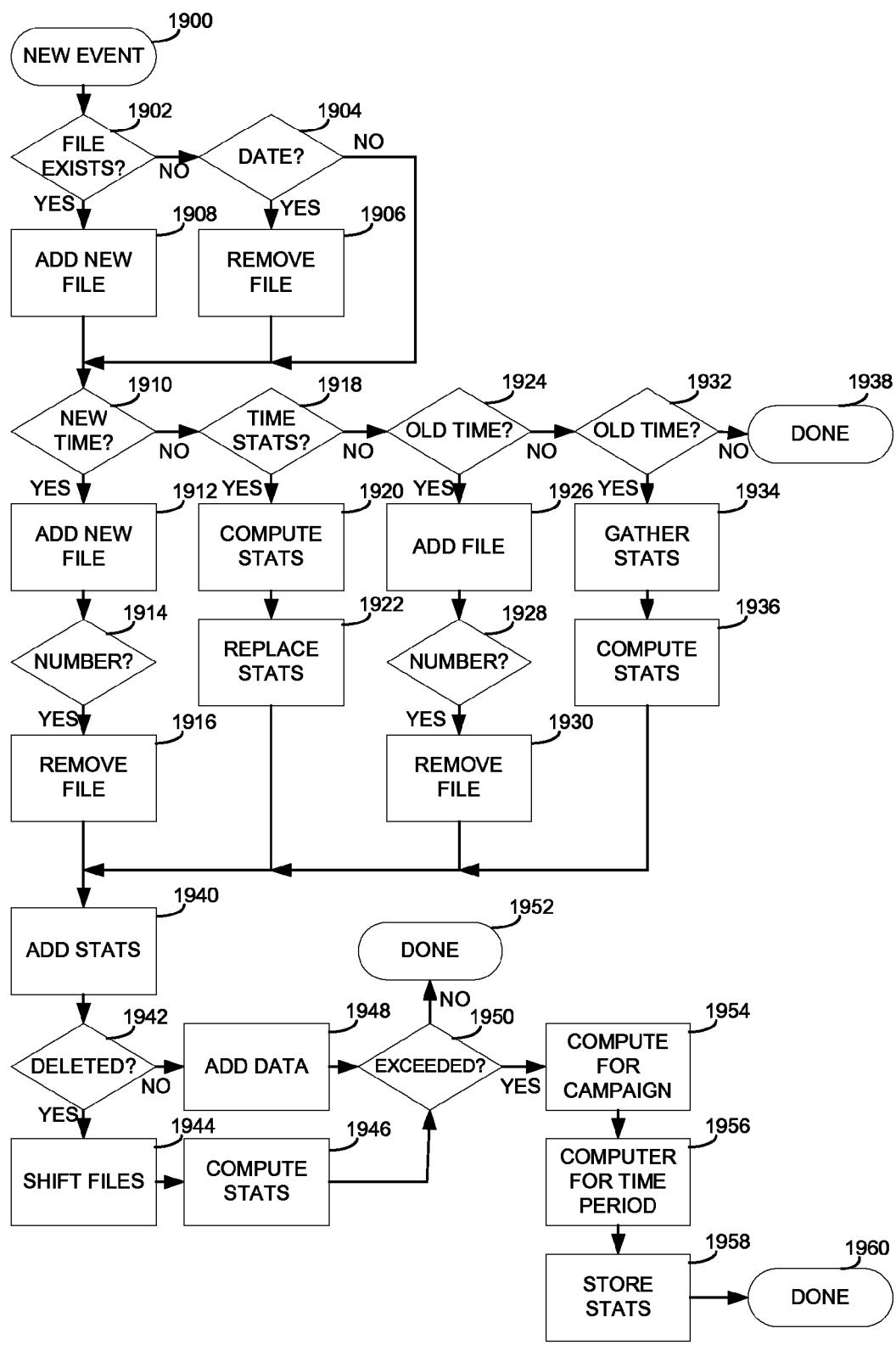
FIG. 19 is a flowchart for operating a targeted sponsored content platform.

FIG. 19 is a flowchart for operating a targeted sponsored content platform. While the flowchart is described with respect to the targeted sponsored content platform 114 and the system 100 generally, it is to be recognized and understood that the flowchart is applicable to any suitable device or system.

In operation 1900, sponsored content event data 306 is received. In operation 1902, it is determine if a first file exists related to a first time period pertinent to the sponsored content campaign, such as one (1) month. In operation 1904, it is checked if the date of the event data 306 is past the end date of a most current first file. If so, in operation 1906, a first file is added or removed so that the start date of the oldest first file is not later than the date of the event data 306 minus ninety (90) days and the end date of the most recent first file is at least as current as the date of the event data 306. In operation 1908, referring to the condition of operation 1902, a new first file is added.

In operation 1910, it is checked if the date of the event data 306 is greater than a maximum date of a second file corresponding to a second time period relevant to the sponsored content campaign. In an example, the second time period is one (1) day. While the flowchart will be discussed with respect to one day periods in the second files, it is to be understood that alternative time periods may be utilized and that the time periods discussed herein may be modified accordingly. In operation 1912, if so, a new file corresponding to a new day is added. In operation 1914, it is checked if there are more than two (2) second files. In operation 1916, if so, the oldest second file is deleted.

In operation 1918, referring to the negative condition of operation 1910, it is checked if the date of the event data 306 exists in statistics of the second file. In operation 1920, if so, statistics for the targeted sponsored content platform 114 relating to the particular server 104A that received the event data 306 are computed. In operation 1922, the computed statistics replace the previous statistics in the second file.

In operation 1924, referring to the negative condition of operation 1918, it is checked if the day of the event data 306 is greater than a minimum day in the second file. In operation 1926, if so, a new second file corresponding to the day of the event data 306 is created. In operation 1928, it is checked if there are more than two (2) second files. In operation 1930, if so, the oldest second file is deleted.

In operation 1932, referring to the negative condition of operation 1924, it is checked if the day of the event data 306 is greater than or equal to the start date of the oldest first time period of the first file. In operation 1934, if so, statistics for the targeted sponsored content platform 114 relating to the particular server 104A that received the event data 306 are obtained. In operation 1936, a change in statistics from the statistics obtained and the event data 306 is computed.

In operation 1938, referring to the negative condition of operation 1932, the flowchart terminates.

In operation 1940, statistics related to the event data 306 are added to the first file. In operation 1942, it is checked if a first file was deleted during the operation of the flowchart. In operation 1944, if so, the first files are shifted one (1) first time period for all first files relating to the sponsored content campaign. In operation 1946, statistics are computed for the first files.

In operation 1948, referring to the negative condition of operation 1942, the event data 306 is added to the first file. In operation 1950, it is checked if a threshold has been exceeded for sponsored content events, such as particular sponsored content events, such as user selections of a sponsored content item 1104. In operation 1952, if not, the flowchart terminates. In operation 1954, if so, statistics related to the sponsored content campaign as a whole are computed, such as user selection of sponsored content, a rate at which sponsored content items 1104 are generated, and a rate at which the generation of sponsored content items 1104 may be changed. In operation 1956, statistics related to a sponsored content item 1104 to which the sponsored content event data 306 corresponds are computed, such as user selection of the sponsored content item 1104, a rate at which the sponsored content item 1104 is generated, and a rate at which the generation of the sponsored content item 1104 may be changed. In operation 1958, statistics calculated herein may be stored for later retrieval. In operation 1960, the flowchart terminates.

Figure 20:
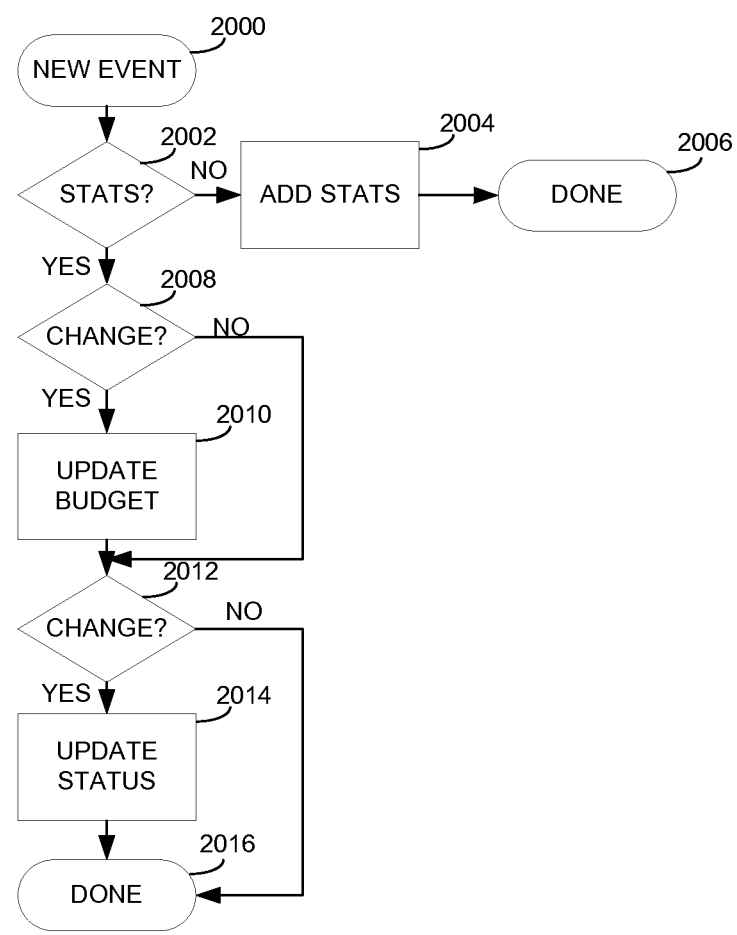
FIG. 20 is a flowchart for managing a sponsored content campaign with a campaign consumption module.

FIG. 20 is a flowchart for managing a sponsored content campaign with a campaign consumption module 302. The campaign consumption module 302 may utilize statistics computed herein. While the flowchart is described with respect to the targeted sponsored content platform 114 and the system 100 generally, it is to be recognized and understood that the flowchart is applicable to any suitable device or system.

In operation 2000, sponsored content event data 306 is obtained. In operation 2002, it is determined if a sponsored content campaign exists in a cache or in the database 116 that corresponds to the event data 306. In operation 2004, if not, the sponsored content campaign is added to the cache or the database 116. In operation 2006, the flowchart is terminated.

In operation 2008, referring to the negative condition of operation 2002, it is checked if the budget for the sponsored content campaign has changed relative to the data in the cache or database 116. In operation 2010, if so, the budget in the cache is updated based on the new budget for the sponsored content campaign. In operation 2012, it is checked if a status for the sponsored content campaign has changed. The status may include any of a variety of status parameters for the sponsored content campaign, such as whether the sponsored content campaign is active or terminated. In operation 2014, if so, the status in the cache for the sponsored content campaign is updated to reflect the changed status for the sponsored content campaign. In operation 2016, the flowchart terminates.

Figure 21:
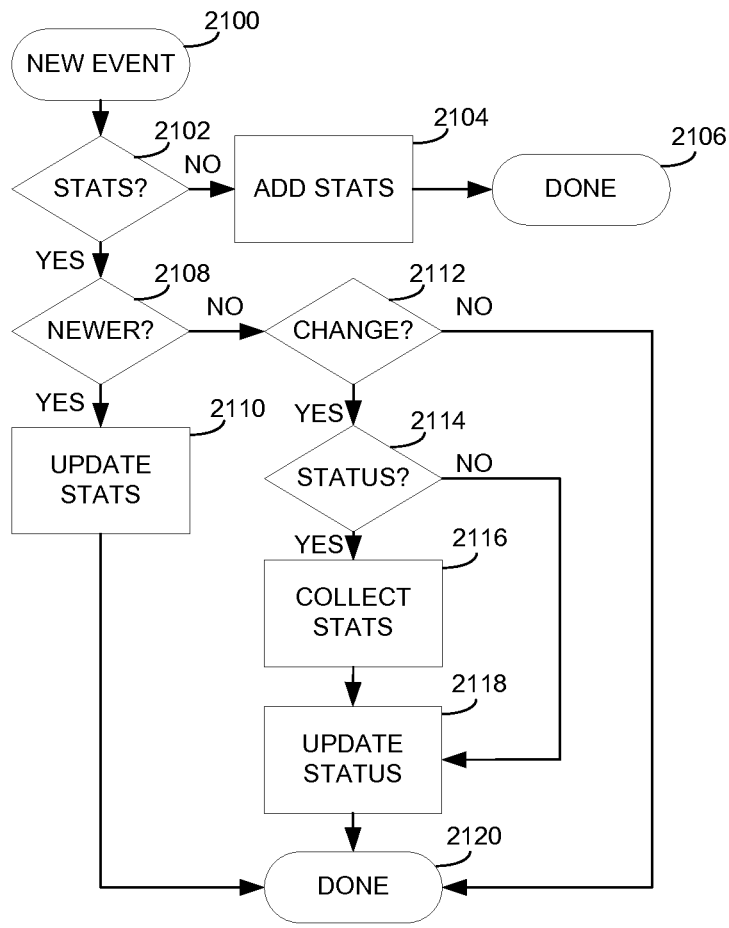
FIG. 21 is a flowchart for managing a sponsored content campaign with a campaign consumption module.

FIG. 21 is a flowchart for managing a sponsored content campaign with a campaign consumption module 302. The campaign consumption module 302 may utilize statistics computed herein. While the flowchart is described with respect to the targeted sponsored content platform 114 and the system 100 generally, it is to be recognized and understood that the flowchart is applicable to any suitable device or system.

In operation 2100, sponsored content event data 306 is obtained. In operation 2102, it is determined if a sponsored content campaign exists in a cache or in the database 116 that corresponds to the event data 306. In operation 2104, if not, the sponsored content campaign is added to the cache or the database 116. In operation 2106, the flowchart is terminated.

In operation 2108, referring to the negative condition of operation 2002, it is checked if a sponsored content item 1104 is newer than a sponsored content item 1104 corresponding to the sponsored content event data 306. In operation 2110, if so, statistics for the sponsored content item 1104 corresponding to the event data 306 is cleared, statistics for the new sponsored content item 1104 may be updated, and the sponsored content campaign may be marked for recalculated statistics.

In operation 2112, referring to the negative condition of operation 2108, it is determined if a status of the sponsored content item 1104 has changed. In operation 2114, if so, it is checked if the status has changed from inactive or terminated to active. In operation 2116, if so, statistics related to the sponsored content item 1104 may be obtained. In operation 2118, a status of the sponsored content item 1104 may be updated in the cache. In operation 2120, the flowchart may be terminated.

Figure 22:
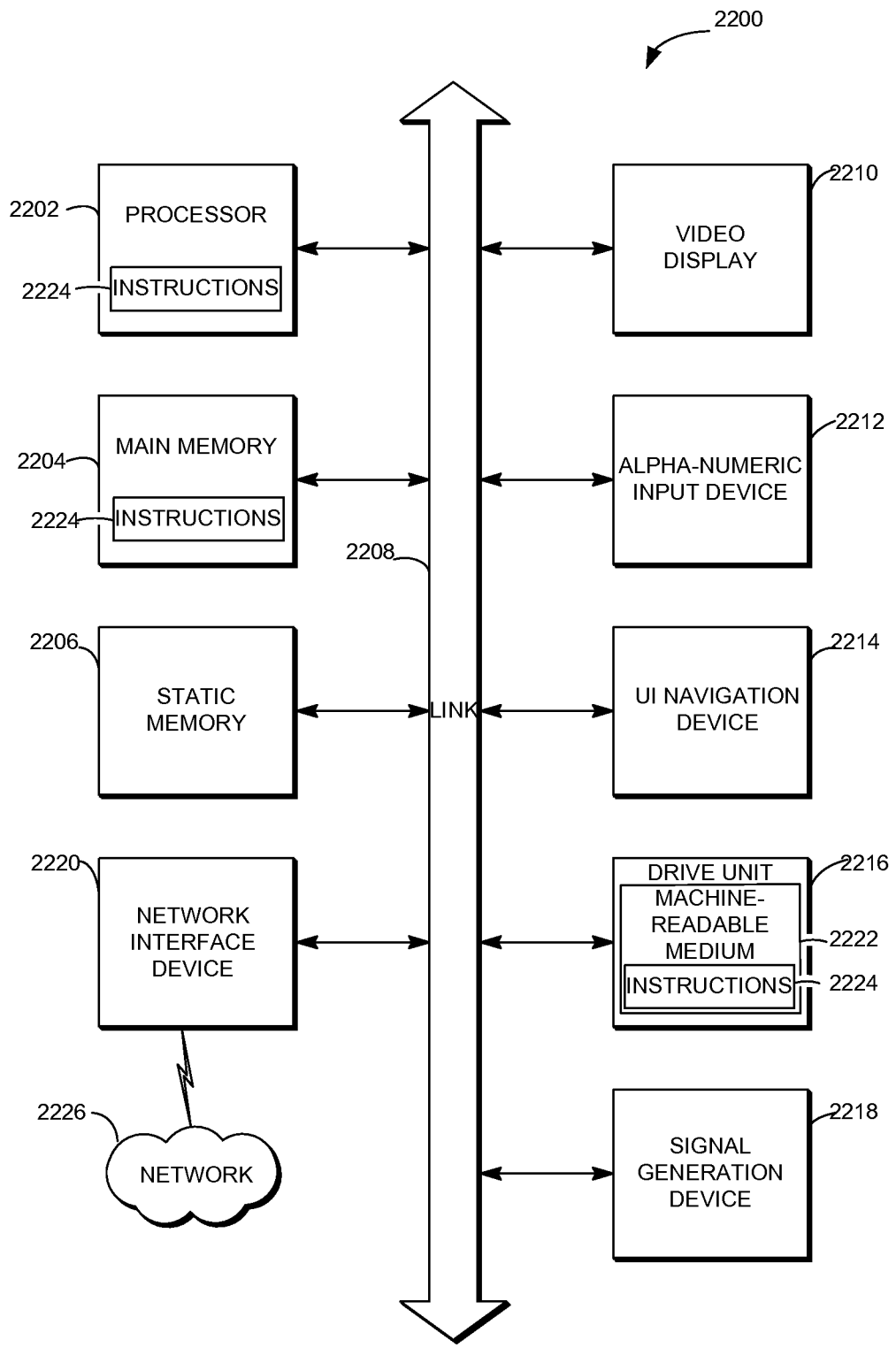
FIG. 22 is a block diagram illustrating components of a machine able to read instructions from a machine-readable medium.

FIG. 22 is a block diagram illustrating components of a machine 2200, according to some example embodiments, able to read instructions from a machine-readable medium (e.g., a machine-readable storage medium) and perform any one or more of the methodologies discussed herein. Specifically, FIG. 22 shows a diagrammatic representation of the machine 2200 in the example form of a computer system and within which instructions 2224 (e.g., software) for causing the machine 2200 to perform any one or more of the methodologies discussed herein may be executed. In alternative embodiments, the machine 2200 operates as a standalone device or may be connected (e.g., networked) to other machines. In a networked deployment, the machine 2200 may operate in the capacity of a server machine or a client machine in a server-client network environment, or as a peer machine in a peer-to-peer (or distributed) network environment. The machine 2200 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 2224, sequentially or otherwise, that specify actions to be taken by that machine. Further, while only a single machine is illustrated, the term "machine" shall also be taken to include a collection of machines that individually or jointly execute the instructions 2224 to perform any one or more of the methodologies discussed herein.

The machine 2200 includes a processor 2202 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 2204, and a static memory 2206, which are configured to communicate with each other via a bus 2208. The machine 2200 may further include a graphics display 2210 (e.g., a plasma display panel (PDP), a light emitting diode (LED) display, a liquid crystal display (LCD), a projector, or a cathode ray tube (CRT)). The machine 2200 may also include an alphanumeric input device 2212 (e.g., a keyboard), a cursor control device 2214 (e.g., a mouse, a touchpad, a trackball, a joystick, a motion sensor, or other pointing instrument), a storage unit 2216, a signal generation device 2218 (e.g., a speaker), and a network interface device 2220.

The storage unit 2216 includes a machine-readable medium 2222 on which is stored the instructions 2224 (e.g., software) embodying any one or more of the methodologies or functions described herein. The instructions 2224 may also reside, completely or at least partially, within the main memory 2204, within the processor 2202 (e.g., within the processor's cache memory), or both, during execution thereof by the machine 2200. Accordingly, the main memory 2204 and the processor 2202 may be considered as machine-readable media. The instructions 2224 may be transmitted or received over a network 2226 via the network interface device 2220.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 2222 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a machine (e.g., machine 2200), such that the instructions, when executed by one or more processors of the machine (e.g., processor 2202), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A system, comprising:
a database configured with individual partitions, one of the partitions corresponding to a sponsored content campaign of a social network, the sponsored content campaign having a campaign termination criterion;
a plurality of servers, each communicatively coupled to the database, and each configured to implement a portion of the sponsored content campaign corresponding to one of the partitions, each of the plurality of servers comprising:
a processor, configured to:
track sponsored content event data received from a user device based on the sponsored content campaign and transmit the sponsored content event data to the database; and
terminate the portion of the sponsored content campaign implemented on a corresponding one of the plurality of servers based on a comparison of a combination of (1) the sponsored content event data as received from a partition of the database corresponding to the sponsored content campaign and (2) an estimation of sponsored content event data received at the database from another server of the plurality of servers to (3) the termination criterion; and
wherein the database is configured to store the sponsored content event data as received from the plurality of servers in the partition corresponding to the sponsored content campaign upon receipt of the sponsored content event data and provide the received sponsored content data to each of the plurality of servers at fixed time intervals.

2. The system of claim 1, wherein the database corresponds to multiple sponsored content campaigns, and wherein one of the partitions corresponds to multiple sponsored content campaigns associated with a sponsoring entity of the sponsored content campaigns.

3. The system of claim 2, where the one of the partitions corresponds to all sponsored content campaigns associated with the sponsoring entity.

4. The system of claim 2, wherein each sponsoring entity corresponding to at least one of the sponsored content campaigns stored in the database corresponds to a different one of the partitions; and
wherein each of the sponsored content campaigns corresponding to the sponsoring entity corresponds to the partition corresponding to the sponsoring entity.

5. The system of claim 4, wherein each sponsored content campaign and each sponsoring entity individually correspond to only one of the partitions and wherein each partition corresponds to only one of the sponsoring entities.

6. The system of claim 1, the processor is further configured to generate a sponsored content group comprising a sponsored content item for transmittal to the user device based on the sponsored content campaign and wherein the sponsored content event data is based on the sponsored content item.

7. The system of claim 6, wherein the processor is further configured to track the sponsored content event data by de-duplicating sponsored content event data that corresponds to a single sponsored content event, wherein a duplicate sponsored content event data is not transmitted to the database.

8. The system of claim 7, wherein the processor is configured to de-duplicate the sponsored content event data based on at least one of a comparison between sponsored content event data and a comparison between sponsored content event data and an associated sponsored content item.

9. The system of claim 6, further comprising a campaign consumption module coupled to the servers configured to determine if the estimation of sponsored content event data received at the database from another server of the plurality of servers was accurate and in response to determining the estimate was inaccurate and the termination criterion were not met or exceeded, reopening the sponsored content campaign.

10. The system of claim 9, wherein the estimation of sponsored content event data is based on sponsored content event data as stored in the database.

11. A memory device, the memory device communicatively coupled to a processor and comprising instructions which, when performed on the processor, cause the processor to:
track, from each of a plurality of servers, sponsored content event data received from a user device based on a sponsored content campaign and transmit the sponsored content event data to a database; and
store the sponsored content event data in one of a plurality of partitions of the database, one of the partitions corresponding to a sponsored content campaign of a social network;
transmit at least some of the sponsored content event data from the partition to at least some of the plurality of servers at fixed time intervals; and
terminate, individually on at the at least some of the plurality of servers, the sponsored content campaign based on a comparison of a combination of (1) the sponsored content event data as received from the partition of the database corresponding to the sponsored content campaign and (2) an estimation of sponsored content event data received at the database from another server of the plurality of servers to (3) campaign termination criterion.

12. The memory device of claim 11, wherein the database corresponds to multiple sponsored content campaigns, and wherein one of the partitions corresponds to multiple sponsored content campaigns associated with a sponsoring entity of the sponsored content campaigns.

13. The memory device of claim 12, where the one of the partitions corresponds to all sponsored content campaigns associated with the sponsoring entity.

14. The memory device of claim 12, wherein each sponsoring entity corresponding to at least one of the sponsored content campaigns stored in the database corresponds to a different one of the partitions; and
wherein each of the sponsored content campaigns corresponding to the sponsoring entity corresponds to the partition corresponding to the sponsoring entity.

15. The memory device of claim 14, wherein each sponsored content campaign and each sponsoring entity individually correspond to only one of the partitions and wherein each partition corresponds to only one of the sponsoring entities.

16. The memory device of claim 11, further configured to generate, from one of the plurality of servers, a sponsored content group comprising a sponsored content item for transmittal to the user device based on the sponsored content campaign, wherein the sponsored content event data is based on the sponsored content item.

17. The memory device of claim 16, further configured to track the sponsored content event data by de-duplicating sponsored content event data that corresponds to a single sponsored content event, wherein a duplicate sponsored content event data is not transmitted to the database.

18. The memory device of claim 17, further configured to de-duplicate the sponsored content event data based on at least one of a comparison between sponsored content event data and a comparison between sponsored content event data and an associated sponsored content item.

19. The memory device of claim 16, further configured to determine if the estimation of sponsored content event data received at the database from another server of the plurality of servers was accurate and in response to determining the estimate was inaccurate and the termination criterion were not met or exceeded, reopening the sponsored content campaign.

20. The memory device of claim 19, wherein the estimation of sponsored content event data is based on sponsored content event data as stored in the database.

\* \* \* \* \*